Oct. 13, 1959 J. W. GRAY ET AL 2,908,902

WORLD-WIDE NAVIGATIONAL SYSTEM

Filed Feb. 17, 1954 9 Sheets-Sheet 1

INVENTORS
JOHN W. GRAY
EVERETT B. HALES
BY IVAN A. GREENWOOD, Jr.
[signature]
ATTORNEY INVENTORS
JOHN W. GRAY
EVERETT B. HALES
BY IVAN A. GREENWOOD, JR.
H. L. Marhey
ATTORNEY

INVENTORS
JOHN W. GRAY
EVERETT B. HALES
BY IVAN A. GREENWOOD, JR
ATTORNEY

INVENTORS
JOHN W. GRAY
EVERETT B. HALES
IVAN A. GREENWOOD, JR.
BY H. L. Mackey
ATTORNEY

WORLD-WIDE NAVIGATIONAL SYSTEM

Filed Feb. 17, 1954 9 Sheets-Sheet 5

INVENTORS
JOHN W. GRAY
EVERETT B. HALES
IVAN A. GREENWOOD, JR.
BY H. L. Mackey
ATTORNEY COMPUTATION OF B FROM L AND $L_o$ $$e_B = \sin L_o \cos\theta - \cos L_o \sin L \sin\theta$$
$$= \cos [\sin B \cos\theta - \cos B \sin\theta]$$
$$= \cos y \sin (B-\theta)$$

INVENTORS
JOHN W. GRAY
EVERETT B. HALES
BY IVAN A. GREENWOOD, JR.
H. L. Mackey
ATTORNEY $$e_y = \cos L \cos L_o + \sin \phi_y$$
$$= \sin \phi_y - \sin y$$
$$e_x = \cos y \sin \phi_x - \cos L \sin L_o$$
$$= \cos y (\sin \phi_x - \sin x)$$

INVENTORS
JOHN W. GRAY
EVERETT B. HALES
BY IVAN A. GREENWOOD, JR.
H. L. Mackey
ATTORNEY $$e_{Lo} = -e_x \cos\phi_{Lo} - e_y \sin\phi_{Lo}$$
$$= \cos L \sin(\phi_{Lo} - L_o)$$

$$e_L = -e_y \cos\phi_{Lo} + e_x \sin\phi_{Lo}$$
$$= \cos L \cos(\phi_{Lo} - L_o) - \cos\phi_L$$

INVENTORS
JOHN W. GRAY
EVERETT B. HALES
IVAN A. GREENWOOD, JR.
BY H. S. Mackey
ATTORNEY

WORLD-WIDE NAVIGATIONAL SYSTEM

INVENTORS
JOHN W. GRAY
EVERETT B. HALES
IVAN A. GREENWOOD, JR.
BY
ATTORNEY

United States Patent Office 2,908,902

Patented Oct. 13, 1959

2,908,902

WORLD-WIDE NAVIGATIONAL SYSTEM

John W. Gray, Pleasantville, Everett B. Hales, Hawthorne, and Ivan A. Greenwood, Jr., Pleasantville, N.Y., assignors to General Precision Laboratory Incorporated, a corporation of New York Application February 17, 1954, Serial No. 410,882

25 Claims. (Cl. 343—7)

This invention pertains to a navigation system for use in navigating a craft of any type anywhere on the earth including the polar regions. More specifically, the invention pertains to an automatic means of ascertaining by dead reckoning the instantaneous position of a moving craft and from that position computing the shortest course to a selected destination. The mechanism of the invention is wholly self-contained and is capable of operating independently of any ground aids or ground sources of information.

The word "navigation" is derived from words which originally meant literally, the moving or directing of ships at sea on the surface of the earth. When the word was first coined, the speed of movement was such that there was plenty of time to make necessary observations from landmarks, where available, or to make celestial observations and make the necessary calculations without appreciable error. This same term is now commonly applied to the art of guiding of aircraft, although some of the means and the methods originated for guiding sailing vessels are inadequate or not available for the guidance of aircraft flying beyond visual range of landmarks and at speeds far exceeding those of ships at sea.

There are a number of related requirements that must be met in guiding aircraft regardless of the technical means by which this is accomplished. In any navigating system, clear and precise information should be given as to the distance travelled since departure, the position, course and heading, and the distance remaining to destination or to a check point and the great circle course to destination. In a system for guiding high speed aircraft, this information must refer to the instantaneous position without the necessity of elaborate corrections and compensations which involve loss of time and liability to human error. Also the system should permit deviations from the shortest course without requiring any loss of time or liability to error in immediately setting the course to the original destination or to a check point. With the present trend toward higher and higher speeds now leading into the sonic region, there is a need for fast computation to the point where a human navigator can no longer act fast enough. Accordingly, the system should present the guidance information automatically and in some cases it is desirable that the system be capable of supplying this information to utilization devices which can directly guide the aircraft.

Furthermore, as the aircraft operate at higher and higher ceilings, the navigation system should be capable of operating independently of any ground aids or any ground source of information. Particularly in the case of military aircraft, it is necessary that the navigation system be not readily subject to jamming, that it not give information usable by enemy aircraft and that it not be easily detectable by enemy observers.

The present invention is particularly directed to a navigation system for guiding aircraft over very wide expanses of the earth and therefore must be capable of operating while relying only upon original information representing the position of the starting point and a certain direction which direction is usually measured to a point on the earth which can be determined without any visual or celestial observations, such as one of the geographical poles of the earth. Accordingly, the present system is of the dead-reckoning type. In any such system the two essential factors are true ground speed and ground track angle. There are certain inherent and statistical errors in any equipment for determining these two factors and accordingly, it is desirable that the system be capable of readily receiving correction data from external sources. Such correction data may be obtained by celestial observation, electronic navigation aids or in some instances land-mark observation. Electromagnetic wave techniques have been developed which are capable of continuously and accurately measuring the true ground speed and true ground track but in order to continuously determine the instantaneous drift angle, it is necessary to make use of the present dead-reckoning system in order to provide information as to the instantaneous position. In order to provide the instantaneous position data, it is necessary to continuously supply the input data giving true ground speed and true ground track to a competent computer which is capable of utilizing the information and continuously computing the instantaneous position. This permits the determination of instantaneous drift which in turn permits the determination of instantaneous change of position, and so on, in a closed information loop.

It can readily be seen that in such a closed loop over a long period of time some error will inherently accumulate. Therefore, it is highly desirable that the computer be capable of utilizing data representing a continuous or discontinuous function without adding any additional error. In other words, shall we say, the computer should be capable of utilizing data which changes smoothly or abruptly as when external correction data is added.

An example of a system utilizing electromagnetic waves to continuously measure the instantaneous aircraft speed and ground track is described in the copending application, Serial No. 49,926, entitled Course and Speed Indicating System, by France B. Berger and William J. Tull, filed September 18, 1948, now Patent No. 2,869,117, and assigned to the same assignee as the instant application.

Because of physical limitations of integrating apparatus, when travelling near the terrestrial poles, it is necessary to provide a new heading reference point with respect to which the true terrestrial position of the craft can be determined. Also because of the magnetic variation, particularly near the terrestrial poles, it is necessary to make corrections continuously and automatically when travelling at high speeds in order to reduce to a minimum the accumulated error. No one medium or component of the system can be utilized exclusively if large accumulating errors are to be avoided.

The term "world-wide navigation system" is used herein to designate a navigation system which is capable of guiding or providing information for guiding a dirigible craft between any two known points on the earth wherein the navigation may or may not be supplemented by visual celestial or terrestrial observations. Although visual observation of land marks and celestial points may be possible at unpredictable times it is necessary that the system be capable of navigation without the benefit of these visual observations. Therefore, it is necessary that all computations be based on some coordinate system fixed relative to determinable points on the earth's surface. The most convenient of such points are the geographical poles of the earth, only one of which need be used at any one time as a reference point. These are convenient points because most of the maps of the world are based on a system of orthogonal coordinates which uses the line joining the North and South Poles as the reference axis. For purposes of illustration, the invention is described in connection with navigation in the Northern Hemisphere where the North Pole is used as the basic reference point or fix point.

Assuming a level platform is available, North may be sensed by celestial observation when possible, or by use of a North-seeking gyro compass but the latter is not practical for navigation of aircraft. Alternatively, the near approximate to true North may be determined by sensing magnetic North and making the necessary corrections for magnetic variation which varies with time and place on the earth's surface. Among other things, the present invention provides a novel heading reference unit having an element which constantly determines the near approximate to true North and aircraft heading.

Since there is necessarily some statistical and inherent errors in the dead-reckoning means for determining the instantaneous position of the aircraft there may be from time to time a slight error in the indicated heading.

In this world-wide navigation system no single instrument, such as a magnetic compass or a gyroscope compass is relied upon to determine the direction of the earth's pole as an accurate fix point.

The usual directional gyro has inherent errors of random drift in addition to systematic errors of earth rate and longitude rate. This random drift error increases with time so that over periods of time of navigational significance, this error may become appreciable. On the other hand, there are regions in the general vicinity of the North and South magnetic poles where a magnetic compass becomes unreliable. In accordance with the present invention a magnetic compass, such as one of the flux valve type, is utilized to introduce a correction to a directional gyro of a heading reference indicator to compensate for random drift while at the same time an additional correction is added to the heading reference indicator to compensate for system errors, such as earth and longitude rate. This latter correction is controlled by a unit which provides an accurate indication of the ground track and speed of the aircraft, such as a radio-echo unit, that is independent of terrain or celestial observations. The ground track and speed data are combined with initial known direction data in a computer which gives the instantaneous position of the aircraft and this position data is utilized to provide the earth and longitude rate corrections to the heading reference indicator of the directional gyro.

The directional gyro is chosen to have small random drift. All computable terms, such as earth rate and longitudinal rate are entered. If either magnetic or astro heading data is available, it is entered with a long time constant, to correct residual errors. The philosophy of this combination is to use the directional gyroscope to average out the short-time fluctuations of the magnetic compass, and to utilize the average value of the magnetic compass direction to cancel the long term errors of the directional gyroscope.

The output of the heading unit supplements the radio-echo speed and direction unit in supplying data for the computation of instantaneous position. The unit that makes this computation comprises an arrangement of components for continuously taking ground track angle relative to true North and ground speed plus an initial fix as input data and automatically producing therefrom instantaneous latitude and longitude as output data. These components include a resolver which resolves ground track speed into N–S and E–W vectors, and two integrators which secure from these two vectors the corresponding displacements. These displacements are indicated on dials or counters in units of latitude and longitude and, if the dials are set at the beginning of a journey to the latitude and longitude of the initial location, the dials will at all times during the journey indicate the instantaneous position of the aircraft, with the accuracy dependent upon the basic data and the statistical and inherent errors of the system.

Such an instantaneous position computer is simple and consists of but few parts. It has, however, a defect that prevents its use at high latitudes, for, although any accurate type of integrator can be used for the purpose described, no type is practical when the position lies near either reference pole because when longitude changes rapidly the integrators are required to operate at very high speed. It has never been possible to construct an integrator that does not have a limited range of speed and if, as in this case, the lower limit is required to be zero, the upper limit of accurate integration is such as to limit such a present position computer to latitudes below 60°.

The instant invention solves this difficulty by employing two different orthogonal coordinate systems to define positions on the surface of the earth. One system is the common latitude/longitude or earth coordinate system of designation of position, employing meridians which are great circles passing through the geographical poles of the earth. In order to provide a factor of accuracy, the conventional geographical coordinate system is employed between about 60° North latitude and 60° South latitude. For latitudes higher than about 60° North or South, another system, herein, called the "transverse coordinate system," is employed although the navigation system continues to compute and give position indications in terms of the geographical coordinates. The transverse coordinate system is based on great circle meridian lines like the geographical system but the "transverse North Pole" lies upon the geographical Equator at 180° longitude, and the "transverse South Pole" lies at the intersection of the geographical Equator and the Greenwich meridian. The transverse Equator therefore corresponds in position with the geographical 90° great circle meridian.

The world-wide navigational computer of the instant invention employs mechanical or electro-mechanical clutches and electric circuit switches for changing its mechanical connections and electrical circuits when shifting from the geographical coordinate system to the transverse coordinate system, and vice versa. These changes are accomplished automatically, being initiated by a switch on the latitude indicator shaft. When the vehicle is between 60° North latitude and 60° South geographical and the geographical or latitude/longitude grid is being employed, the computer is said to operate in the normal mode.

The instantaneous latitude and longitude data of this invention may be employed directly as indicated outputs to aid in manual piloting of the aircraft. Alternatively, the latitude and longitude output dials may be accompanied by shafts whose angular positions at all times represent the instantaneous position data and these shafts may actuate succeeding equipment to compute and indicate the great circle course and shortest distance to destination. This may be accomplished by a combination of resolvers, which are capable of being adjusted by the use of two dials in accordance with the latitude and longitude of the destination. This equipment may also be arranged to indicate merely the difference between the desired course and the actual track and a pilot's direction indicator (PDI) may be employed as a steering aid. Furthermore, the data supplied to the PDI may also be used to control an automatic pilot, such a combination making navigation and piloting interrelated and completely automatic thus completing a servo loop including the pilot, the worldwide navigator and the dirigible vehicle. When a human pilot is operating, the PDI and the human pilot would replace the automatic pilot. Examples of apparatus for computing the instantaneous great circle course and for integrating the distance travelled are shown and described in copending application of John W. Gray, S.N. 179,452, filed August 15, 1950, for Homing Navigator, now Patent No. 2,749,035, and application of John W. Gray et al., S.N. 193,168, filed October 31, 1950, for Great Circle Computer, now Patent No. 2,688,440. Both of said copending applications are owned by the assignee of the present application.

The general object, therefore, of the instant invention is to provide automatic means for navigating and/or piloting a vehicle between any points.

Another object of this invention is to provide automatic means for navigating a vehicle between any points over the shortest and most direct path which path may pass through or near a geographic polar region, employing as input data speed and drift data ascertained in any desired manner.

More specifically, the objective of the present invention is to provide an automatic mechanism which utilizes as input data last fix, heading, ground speed, and drift angle and computes therefrom the quantities of present position in latitude and longitude, course to be travelled to destination, and distance remaining to be travelled, such mechanism being accurately operative over the entire surface of the earth.

Another object is, in any vehicle, to provide automatic means for obtaining data representing the great circle course and distance to a preselected destination from data representing the last fix, ground speed and drift angle.

Another object is to provide automatic means for computing from vehicle velocity data and last known position data the present position of the vehicle.

Another object is to provide in a navigation system, means to furnish data automatically to an automatic pilot enabling it to steer the great circle course to a preselected destination, said means utilizing speed, drift, and last fix data as inputs from any source.

Another object is to provide a novel homing navigation device capable of homing on any preselected point when the position of the point and the instantaneous position of the craft is expressed in the same grid system or in systems having a known relation.

A further specific object is to provide a world wide navigation system particularly adapted to aircraft that can be carried entirely by the using aircraft; that can measure the ground speed directly and accurately over all types of terrain; that can provide instantaneous drift angle data and automatically and continuously compute, true ground track as distinguished from aircraft heading; that can compute the great circle course and instantaneous distance to destination when the system is adjusted in accordance with the latitude and longitude of the point of departure (or instantaneous position) and the point of destination; that can provide accurate navigation data over long periods of time without need of supplemental checks by celestial observations or visual observation of landmarks; that can provide visual indication of navigational information for a human pilot or furnish control signals utilizable by an autopilot to complete a navigation-piloting loop; that utilizes sharply defined electromagnetic wave beams which pass over a given ground point in a very short time interval making it difficult to detect by an enemy; that is provided with a direction and speed "memory" for continuously providing course and distance data based on the last instantaneous data, thus making it possible to maintain radio silence for substantial periods of time without appreciable error; and, in which the "memory system" functions automatically when jamming signals are received or when no signals are reflected from the terrain of the earth.

A further understanding of this invention can be secured from the following detailed description and the drawings, in which.

Figures 3, 5, and 6 and 6*a* are graphical diagrams illustrating principles of the invention.

Figure 1:
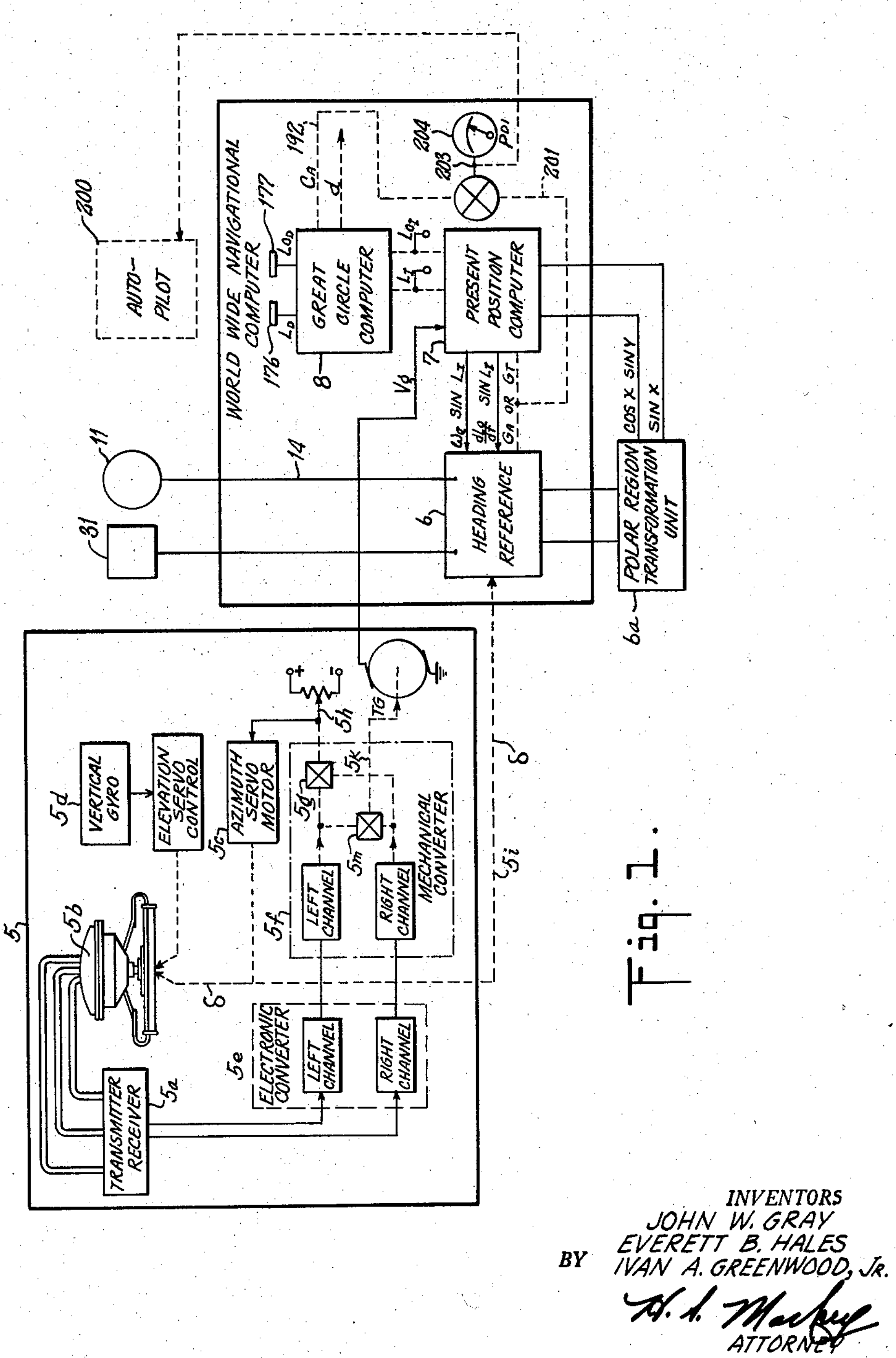
Figure 1 is a block diagram of the principal components of the apparatus of the invention.
Figure 2:
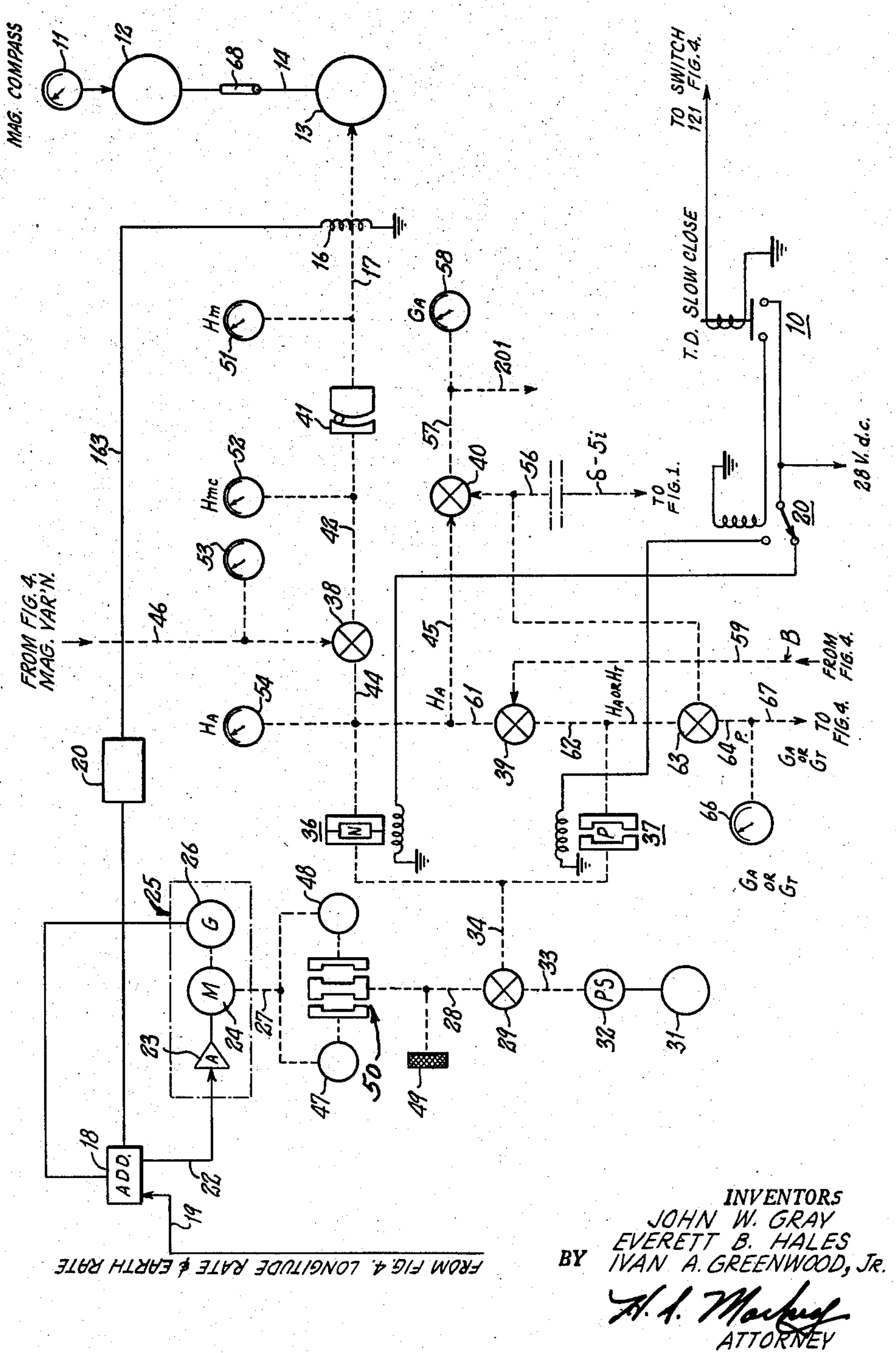
Figure 2 illustrates the circuit of the heading reference unit utilized in the system of the invention.
Figures 1, 4:
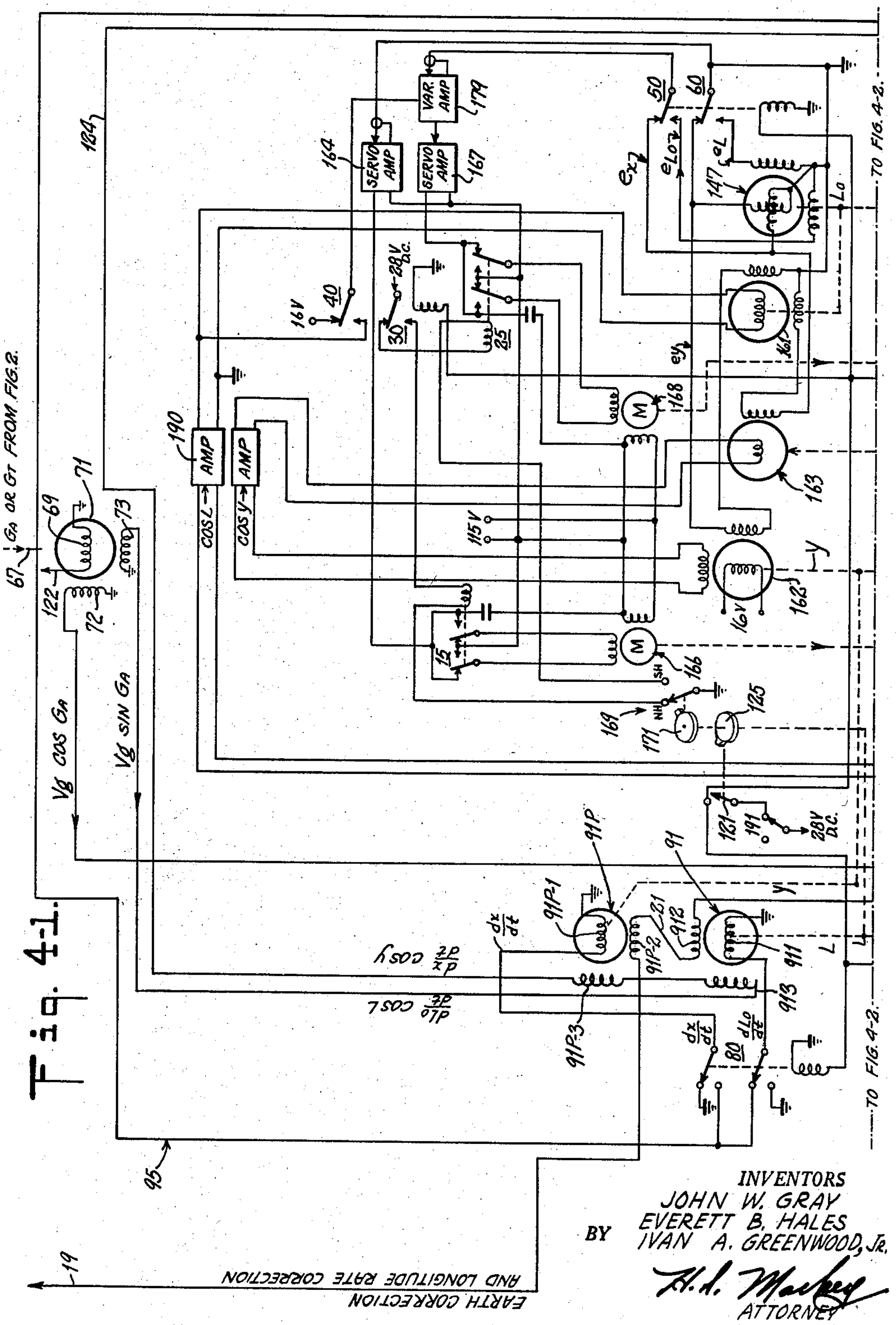
Figures 2, 4:
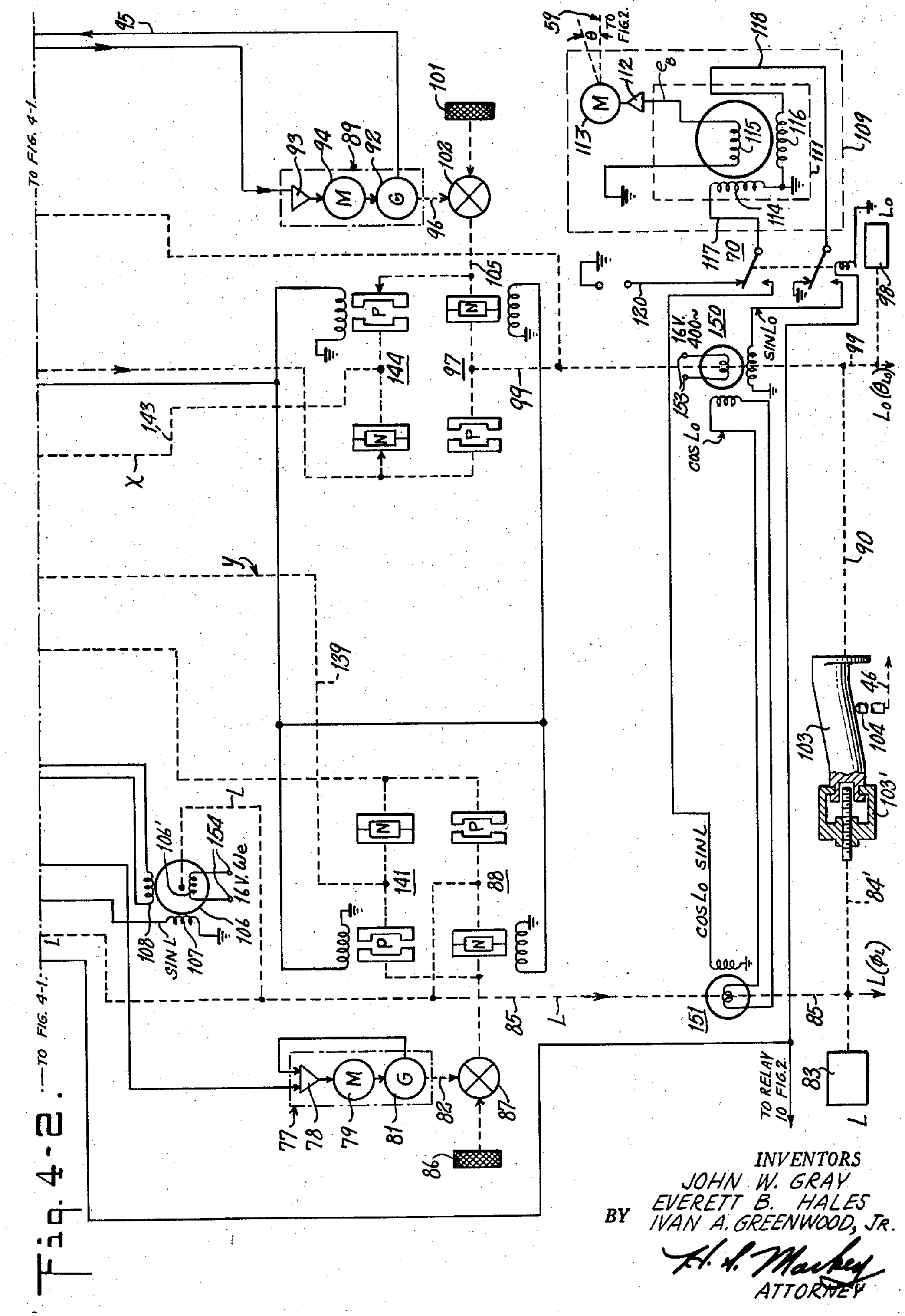

Figures 4–1 and 4–2 combined (hereinafter referred to as Figure 4) illustrate the circuit of the present position computer of the invention.

Figure 4A:
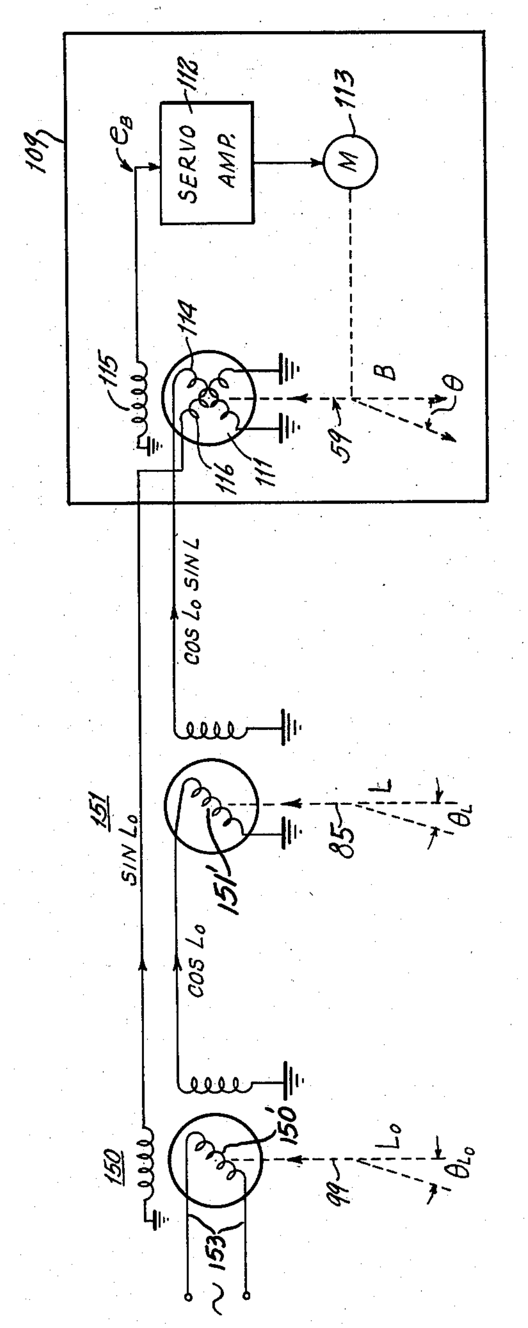
Figure 4B:
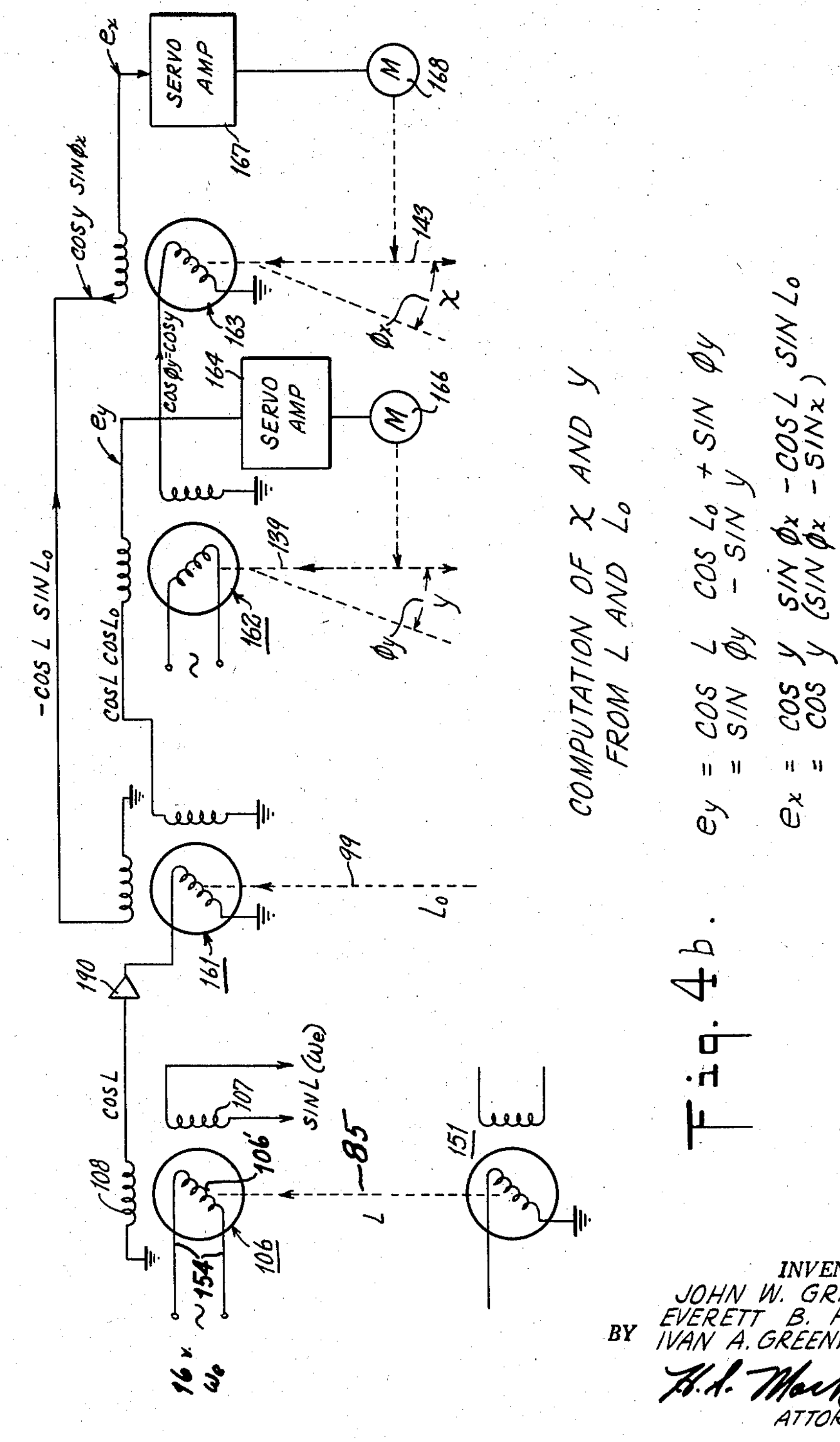
Figure 4C:
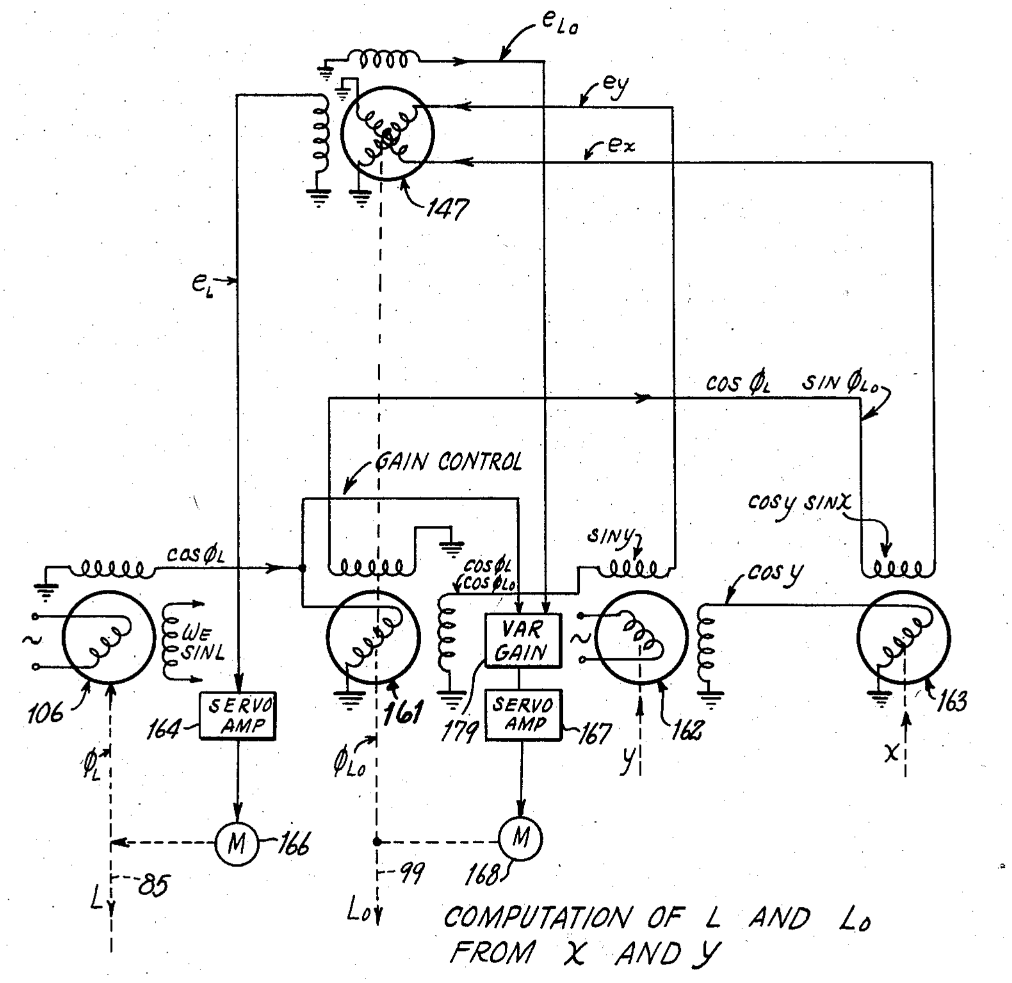

Figures 4*a*, 4*b* and 4*c* illustrate the three respective electrical configurations for computing the angle B, for computing transverse coordinates from the geographical coordinates and for computing the geographical coordinates from the transverse coordinates.

Figure 7:
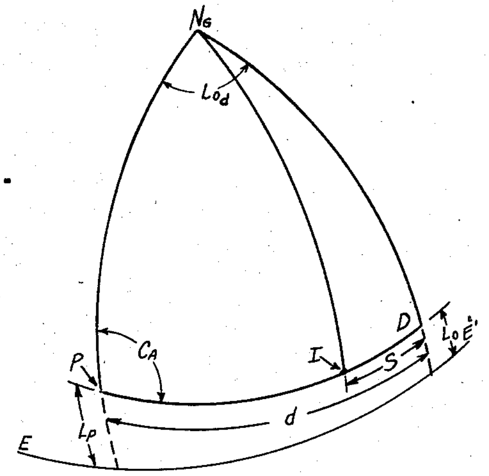

Figure 7 shows a spherical triangle illustrating the navigation problem.

Figure 8:
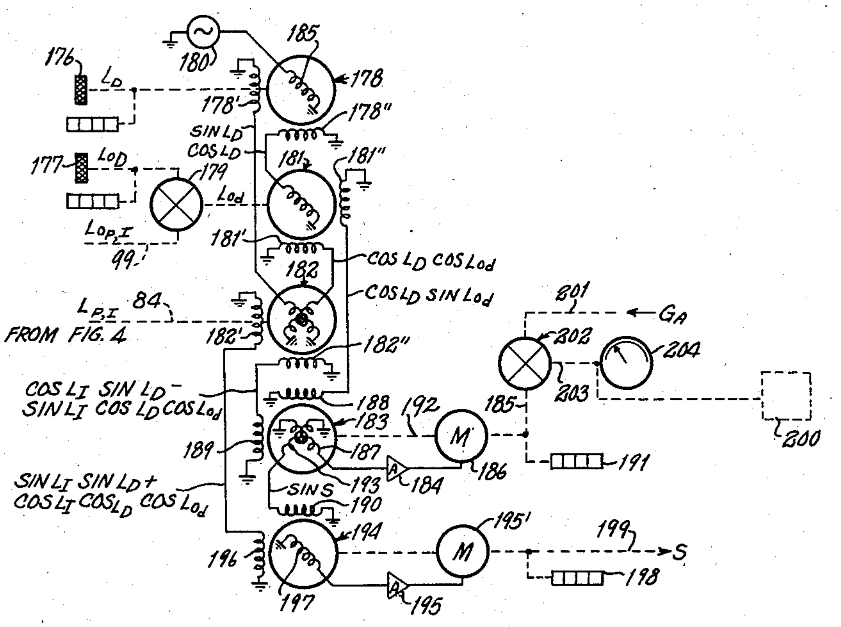

Figure 8 illustrates the circuit of the great circle computer utilized in the system of the invention.

The world-wide navigational system of the present invention, although applicable to the determination of the course of any vehicle, is more especially applicable to navigation of aircraft, and therefore, its use on aircraft is selected, for purposes of illustrating the invention.

The system of the present invention is in effect a homing navigation-piloting system in which the location of any point on the earth can be selected in terms of coordinates of a selected coordinate system and the craft may be caused to home to that point. The system has capabilities of continuously and automatically providing, from an initial fix point and direction data and an indication of the instantaneous position relative to the earth, the true ground speed, distance travelled, corrected compass course, drift angle, true ground track, great circle course and distance from instantaneous position of the aircraft to any selected destination on the surface of the earth, time of arrival at the selected destination and the angular distance between true ground track and the great circle course to the selected destination.

Functionally, the system may be divided into two major parts, namely, the radio-echo speed and direction component indicated in Fig. 1 as the units within block 5 and the computer-indicator component made up of the units in blocks 6, **6*a*, 7, 8 and 9**. The various blocks in Fig. 1 further divide the system functionally and the flow of the basic data is indicated by the arrows, the electrical paths being indicated by solid lines and the mechanical paths being represented by dashed lines.

The radio-echo component 5 comprises a transmitting and receiving unit **5*a* having a special antenna assembly 5*b* which transmits pulses of radio frequency energy and utilizes a narrow spectrum of radio-echoes from areas of the earth spaced laterally and longitudinally of the aircraft which are "illuminated" by the radio energy. In the embodiment illustrated the antenna assembly 5*b*** preferably includes three highly directive arrays so disposed as to direct three separate beams of microwave radio energy toward the earth in a manner simulating the legs of a tripod with the illuminated area of one beam centered on the ground track of the aircraft longitudinally of the aircraft and the areas of illumination of the other beams disposed symmetrically laterally and longitudinally of the aircraft in the direction opposite the other illuminated area.

In one of the practical embodiments of the radio-echo component, two antennas direct radio beams forwardly and laterally of the vehicle and one is centered on the ground track rearwardly of the aircraft. However, in another embodiment the orientation of the antennas is reversed. If desired, an antenna assembly having two rearwardly and two forwardly directed arrays could be used. The invention is not limited to the specific type of antenna system used except insofar as it may embody the fundamental principles described herein.

In the broadest aspect of the invention, a separate transmitting antenna may be used and it need not necessarily have the special gain characteristics of the antennas described herein.

The antenna assembly *5b* is appropriately servoed by azimuth servomotor *5c* so that a constant relation is maintained between the orientation of the assembly and the true ground track and the modus operandi is based on this premise.

Because of the relative motion between the source of the microwave energy and the earth, microwave energy in the form of electromagnetic waves reflected from the earth to the forward-looking arrays will be Doppler-shifted to an apparent higher frequency and energy returned to a rearwardly-looking antenna will be shifted to an apparent lower frequency. Should the antenna assembly *5b* pitch as a result of motion of the aircraft or otherwise, the Doppler frequency of a forward-looking antenna and a rearward-looking antenna would vary in the same direction although by a slightly different amount. Although the difference frequency would remain almost constant a very small error would result and in order to eliminate this, the antenna assembly *5b* is horizontally stabilized by a vertical gyro *5d* which may be physically located in the automatic pilot (not shown).

The transmitter-receiver unit *5a* compares the Doppler frequency shift between the forward- and rearward-looking antennas to produce two independent Doppler signals, each proportional to the ground speed when the antenna assembly *5b* is properly aligned with the ground track. These two independent Doppler signals are supplied by the respective left and right channels to an electronic converter *5e*. Each of the two Doppler signals comprises respective bands of frequencies and the electronic converter *5e* is provided with a frequency tracker for each channel which trackers select the "centers" of the respective spectra and produces D.-C. voltages whose amplitudes are, respectively, proportional to the frequencies of the frequency spectra in the channels. The respective D.-C. voltages are supplied to an electromechanical converter *5f* which includes velocity servos energized by the respective voltages in the right and left channels. These servos convert the voltages to corresponding shaft rotations, the angular velocities of which are proportional to the respective Doppler shifts. The shaft rotations are supplied to a differential 5g where they are subtracted and the difference, if any, is utilized to operate a potentiometer *5h* which supplies a control voltage to the azimuth servo motor *5c* to orient the antenna assembly *5b*. The operation of the radio-echo component 5 is based on the premise that the antenna assembly *5b* will be constantly aligned with the true ground track of the aircraft, and accordingly the angle between the axis of the antenna assembly *5b* and the axis of the aircraft will be proportional to the drift angle ($\delta$). This drift angle ($\delta$) is represented by the angular displacement of a mechanical connection, such as a shaft represented by the dashed line *5i*, and is supplied to the heading reference unit 6. This system is capable of measuring drift up to 50° right or left.

The shaft rotations of the velocity servos of the mechanical converter *5f* are averaged in a second differential *5m*, the output shaft *5k* of which drives a generator TG the output of which is a voltage ($V_g$) representing the ground speed of the aircraft.

The function of the heading reference unit 6 is to ascertain the direction to some definite point on the earth's surface from the instantaneous position of the aircraft and by referring this direction to the heading direction of the vehicle to furnish the heading angle. The geographic poles are the most convenient fixed reference points on the earth and preferably the nearest one, such as the North magnetic pole when traveling in the Northern Hemisphere, is chosen as the heading reference point. The true North and South Poles are easily located by making the appropriate known correction for declination and variation. Although, as previously mentioned, the integrators integrate in terms of a special transverse coordinate system when travelling in the polar regions, the final output data are in terms of the common geographical coordinates in which coordinates it is conventional to locate all points on the earth's surface. Since there is a preselected relation between the transverse axis and the North and South Pole axis of the geographical coordinate system any point on the earth's surface may be located in terms of either system. The heading reference unit 6 combines heading angle with drift angle to form the ground track angle in terms of either coordinate system. The elements of the heading reference unit may be adjusted so that a certain configuration of electrical and mechanical connections functionally constitutes a subunit designated 6*a*, which causes the heading reference unit 6 to furnish true ground track angle data in terms of transverse coordinates, above some arbitrary latitude, such as 60° latitude. The functional configuration represented by the subunit 6*a* is automatically controlled by data furnished by the present position computer 7.

The heading reference unit 6 furnishes ground track angle ($G_A$) or ($G_T$), depending upon the mode of operation, as later described, to the computer 7 which combines it with ground speed data ($V_g$) from the radio-echo component 5 and gives instantaneous latitude and longitude during the journey. The lattitude and longitude data are supplied to the great circle computer 8. The output shafts of the computer 7, can be adjusted by appropriate dials to represent, respectively, the latitude and longitude of the point of departure, or alternatively, the instantaneous position of the aircraft if for some reason it becomes necessary to make a correction during flight. These new settings then serve as the basic references to which the changes in the latitude and longitude are added during the journey.

The instantaneous latitude and longitude output data from the present position computer 7 constitute input data for the great circle computer 8 which latter data are supplemented by the latitude and longitude of the destination, respectively, and the great circle course ($C_A$), and distance to destination (S) (see Fig. 7), are automatically computed therefrom. Alternatively, the course angle may be subtracted from ground track angle in a differential 202 to indicate the steering error which is indicated on a pilot's direction indicator (PDI) 204.

*Heading reference unit*

Referring now to Fig. 2, a magnetic compass, preferably of the flux valve type is represented at 11. The magnetic compass is equipped with a flux element 12 that energizes a control transformer 13 through electrical conductors, collectively represented by the line 14. The control transformer 13 is provided with a rotor winding 16 which produces an output potential at its terminals that depends upon the angular position of the rotor shaft 17 to which it is fixed. The output voltage is a function of the angle between the resultant field of the stator of control transformer 13 and the position of the rotor winding 16. The direction of the resultant field of the stator is a direct function of the direction of the earth's magnetic flux relative to the flux valve fore-and-aft axis. The shaft 17 is positioned by a motor 24 controlled in part by the error voltage of the coil 16 in a manner to be described, the whole constituting a feedback loop and operating as a servomechanism to hold the average error voltage at zero. The voltage in coil 16 becomes the error voltage of this servo, and is applied through a converter-amplifier 20 to an adding unit 18 where this voltage is added to a correction voltage on a conductor 19 representing longitude rate and earth rate as will be further described later. The sum of the three voltages is applied through conductor 22 to an amplifier 23 and thence to the motor 24, which latter is a component of a gyro rate servo 25. A tachometer generator 26 driven by the motor 24 supplies a feedback voltage to adding unit 18. The rate of speed of rotation of the motor output shaft 27 is proportional to the input signal. This shaft 27 is adapted to be alternately connected through either gear train 48 or 47 to one input connection 28 of a differential gear 29.

Since the error signal from the control transformer 13 has a frequency of 800 cycles and the other equipment is designed for 400 cycles, the frequency converter-amplifier 20 is provided.

A directional gyroscope 31 is provided with a servo transmitter that energizes a follow up position servo 32 that duplicates the azimuthal rotation of gyro 31 in a manner well known in the art, the resulting angular deflection of the output shaft 33 of the position servo 32 thus being representative of the directional indication of the gyroscope 31. The output shaft 33 is connected to the second input of the differential 29 so that the angular deflection of its output connection 34 represents the sum of its two input deflections, that is, the position indication of the gyroscope 31 and the instantaneous position of the shaft 28 as determined by the rate servo 25. This directional information when modified by the local magnetic variations, hereinafter explained, gives either true or transverse heading.

To this end, the output shaft 34 is connected to one side of each of two clutches, 36 and 37. Only clutch 36 is closed in the normal mode of operation and only clutch 37 is closed in the polar mode, as hereinafter explained. When clutch 36 is closed the shaft 34 drives one side of each of the differentials 38, 39, and 40. The output of differential 38 has a driving connection through an adjustable cam 41 with the shaft 17 of the synchro 13, thus completing the compass servo loop. The purpose of the cam 41 is to provide adjustment between the relative position of shafts 42 and 17 to compensate for deviation; that is, local distortion of the earth's magnetic field due to the local environment in which the magnetic compass 11 is associated, such as the structure of the vehicle and apparatus carried thereby and to compensate for synchro transmission errors.

A correction for magnetic variation is introduced through the differential 38 as a relative angular displacement between shafts 44 and 42. This variation angle is secured from a three-dimensional cam 103 located in the present position computer 7 and is introduced through shaft 46. Thus, through the differential 38 and the cam 41 the servo loop is corrected mechanically for magnetic variation and deviation, so that when the rotor of the control transformer 13 is in null position the deflection of shaft 34 represents true heading.

The directional gyroscope 31 is of a well-known aviation type that is continuously precessed so as to remain with its axis of rotation parallel to the surface of the earth. Otherwise it is free, and therefore, because of the principle of space rigidity, its axis tends to remain directed toward some fixed point in space, while the earth turns beneath it. Such a free gyro has an apparent drift (aside from random drift due to unbalance and gimbal friction) due to rotation about the earth's axis. The rate of drift is ($\omega_e \sin L$), in which ($\omega_e$) is the sidereal rate of rotation of the earth (15° per hour) and (L) is the instantaneous latitude of the position of the directional gyroscope 31. The gyroscope spin axis continually shifts its terrestrial direction of pointing because of this effect. This shift is termed the "earth rate error." In addition to this earth rate error, when the gyroscope is moved relative to the earth in an easterly or westerly direction, as when it is carried in an aircraft, this movement will produce an additional apparent change relative to true North in the azimuth direction of pointing of the gyroscope. This change is termed the longitude error and its rate has the value $$\left(\frac{dLo}{dt}\sin L\right)$$

The composite voltage on conductor 19, representing the earth rate and longitude rate, is received from the instantaneous position computer 7 where the voltage is generated in a manner hereinafter described in connection with that unit.

It should be apparent from the above that when the heading has once been established the data from the magnetic compass 11 and the magnetic variation data serve only to monitor the heading information as determined by the gyro 31 and the gyro correction servo 25. Therefore, the error signal correction data from the magnetic compass 11 and the gyro correction servo 25 may be bypassed for considerable periods of time and insofar as the gyro 31 is correct, the heading data indication will be maintained correctly. The apparent drift error of the gyro increases with time and the advantage of the servo control is to maintain the shaft 34 at an accurate true heading which can be projected forward chronologically with the proper corrections for earth rate and longitude rate from the servo 25. Generally speaking, the earth's flux is reliable as a reference throughout the major portion of the earth's surface. In regions where the earth's magnetic flux is unreliable, such as near the earth's poles, the directional gyro 31 may be relied upon for heading indication and if celestial observation is possible the heading may be checked by astro-compass from time to time.

In addition to the regular apparent drift errors, the gyroscope 31 has an oscillatory random error much lower than the earth and longitude rates. On the other hand, the magnetic compass 11 has a short time error. When these two units are included in the servo loop both random errors are substantially eliminated.

Although it has been mentioned that the directional gyro 31 is used as the heading reference when the earth's magnetic flux is not reliable, it is only because of the cooperative association in the system with the radio-echo component 5 which continuously supplies data for providing the necessary earth rate and longitude rate correction strictly in accordance with the actual path of travel of the vehicle that this is possible. Therefore, so long as navigation is initiated at any point with the adjustment of the components corresponding to the instantaneous position of the vehicle, the system will provide accurate navigation data to any preselected point.

When the heading reference unit 6 is started in operation, in general, only the magnetic compass 11 will have the correct orientation. Because of the normal step-down gear ratio in the feedback loop of the synchro 13, several hours may be required to servo this synchro to its null point. There is therefore provided, for starting purposes only, a fast gear train 47 which may be interposed in the servo loop instead of the normal slow gear train 48, by manipulating the gear-shift knob 49. After the several dials and counters have come to their proper positions, the knob 49 is returned to its normal operating position where the slow gear train 48 is interposed in the loop.

In general, in the schematic diagrams illustrating this invention speed change gears are omitted as not essential to an understanding of the invention. Likewise such conventional devices as bevel gears, amplifiers and the details of some servos are omitted where clarity is thereby facilitated.

The heading reference unit 6 as so far described includes a synchro 13 for receiving directional indications from the magnetic compass 11, combined with a feedback loop to servo shaft 17 to null, the loop containing a directional gyroscope 31 and four correctional elements, namely, magnetic compass 11, magnetic variation correction element 46 and earth rate and longitude rate elements supplying correctional data over conductor 19. The operation of this loop is such that the magnetic compass 11 may serve as the heading reference when that compass is in operation with the directional gyroscope 31 automatically becoming the heading reference the instant that the energization of the synchro 13 is removed by interruption of the control cables 14.

The high step-down ratio of the gear train 47 in the heading reference feedback loop produces therein a loop time constant having a large smoothing effect, so that the angular rotation of the output shaft 34 reflects only the angular position of the magnetic compass 11 averaged over a considerable period of time and does not appreciably respond to rapid changes in the signals from the compass 11. This action is exceedingly important in air navigation, because local variations in the horizontal magnetic field of the earth are usually not charted and in any case need not be followed. Moreover, even if the data were known it would be impractical to include such large scale data in the small scale three-dimensional variation cam 103 that is employed to introduce magnetic variation. It is desirable to have a large slaving time constant in order to secure a large smoothing effect. However, another consideration dictates a small slaving time constant, this being that any systematic error introduces a definite error expectancy in the output of the loop that is directly proportional to the slaving time constant. Therefore it is necessary to eliminate all possible systematic errors in order to permit the use of a large slaving time constant. This has been done in this invention, particularly by the introduction of accurate longitude and earth rate corrections to the directional gyroscope.

The feedback loop of the servomechanism that comprises the heading reference unit can be considered to be an electromechanical low pass filter that restricts data received from the magnetic compass to data not containing frequencies higher than a specific cut off value having an inverse relation to the slaving time constant. That is, this filter filters out high cyclic frequencies and smooths non-periodic disturbances.

Figure 3:
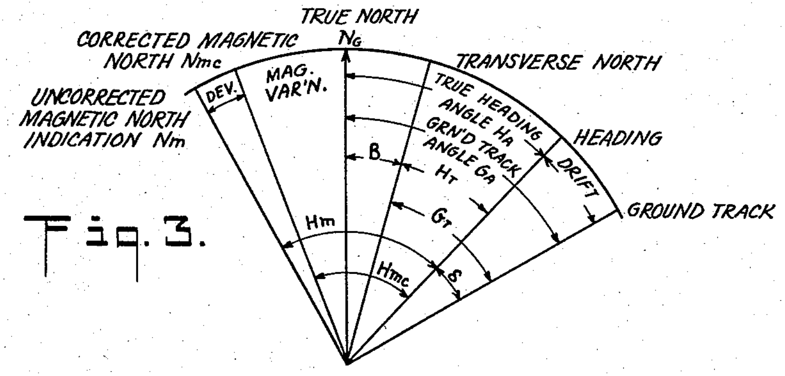
Figure 5:
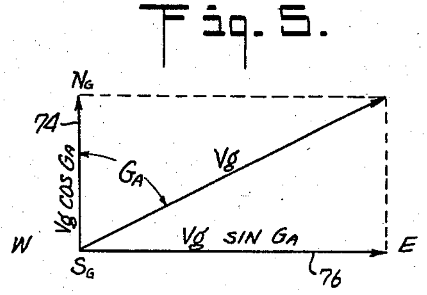

The smoothing effect is proportional to the "slaving time" constant of the feedback loop. Two of the four correctional elements are for the purpose of adding corrections to the magnetic compass indications, as described, and the several sections of shaft are provided with indicating dials for the display of the resulting shaft deflections. The dial 51 indicates the uncorrected magnetic heading of the aircraft as received from the magnetic compass 11 in accordance with the angular position of the shaft 17. This angle is graphically shown in Fig. 3 as ($H_m$). Dial 52 indicates the deflection of shaft 42, indicated by ($H_{mc}$), the magnetic heading after correction by the magnetic deviation correction cam 41. Dial 53 indicates the magnetic variation angle received from the three-dimensional cam 103, and dial 54 indicates ($H_A$), the true heading of the aircraft. The relations of all of these angles are shown in Fig. 3.

The drift angle ($\delta$), representing the effect of cross wind upon the path of travel of the airplane, and defined as the difference between the true heading and the ground track, is introduced as a shaft angular displacement by a shaft 56, Fig. 2, from the aforementioned radar component 5. The equivalent of the shaft 56 is represented in Fig. 1 by the dotted line *5i*. This angular displacement ($\delta$) of shaft 56 is added to the angular displacement of shaft 45 representing the true heading ($H_A$) in differential 40 to form the ground track azimuth angle ($G_A$), represented by the angular displacement of the mechanical connection 57. This angle ($G_A$) is indicated on dial 58.

As previously mentioned, difficulty is encountered in providing an integrator that can operate accurately when the longitude changes rapidly, such as occurs at latitudes greater than approximately 60°. In accordance with this invention special provision is made for automatically changing the position coordinate system in which the poles are never so close to the actual position of the craft as to require an integration rate beyond the practical limit of integrators. In the present application only two coordinate systems are referred to, namely, the true geographical system and the so-called "transverse" system. However, for reasons hereinafter apparent from the description, additional systems may be used so that the maximum integration rate may be even smaller.

The data from the heading reference unit 6 described immediately above is supplied to the present position computer unit 7, which continuously computes the instantaneous position of the vehicle in terms of the geographical coordinates. The computer also provides output data in the form of angular displacement of a shaft 59 which angular displacement is supplied to the differential 39 where it enters the computation of instantaneous position. This angular displacement is represented by the angle (B) in Fig. 3 and is defined as the angle between the geographical meridian and the meridian of the new coordinate system, in this instance termed the "transverse system," at the indicated position of the vehicle. This angle (B) being a function of position on the globe, varies from +180° to −180° when the reference pole is a "transverse" pole, that is, when the navigation system is operating in the polar mode; but angle B is zero when the system is operating in the so-called normal mode, in which a geographical pole is the reference pole.

The introduction of this angle (B) to the heading reference unit 6 constitutes one of the factors in changing the computer 7 from operation in the normal mode to operation in the polar mode.

The effect of the introduction of the angle (B) to the heading reference unit 6 and the necessary corresponding changes in the present position computer 7 may be considered functionally as the polar transformation unit *6a* shown in Figure 1.

The angle (B) is added to the true heading angle ($H_A$) represented by angular displacement of shaft 61 through the differential 39. When the computer 7 operates in the normal mode, angle (B) is zero and therefore the angular displacement of the mechanical connection 62 corresponds to the angle ($H_A$). When the computer 7 operates in the polar mode, however, the angle (B) may be other than zero and the deflection of shaft 62 is the difference between ($H_A$) and (B) which is defined as the transverse heading and is designated as ($H_T$). That is, $$H_T = H_A - B \qquad (1)$$

The output of differential 39 is therefore either ($H_A$) or ($H_T$) depending upon whether the system is operating in the normal mode or the polar mode. This output is combined in another differential 63 with the drift angle ($\delta$) to form the ground track angle. When the system is operating in the so-called normal mode this angle ($\delta$) is referred to true North and is represented by ($G_A$) but when the system is operating in the polar mode the angle is referred to the transverse "North Pole" of the transverse coordinates and is termed ($G_T$). In either case this ground track angle is represented at the mechanical output connection 64 of differential 63 which is connected to a dial 66 and to a shaft 67 leading to the present position computer 7.

In switching the heading reference unit 6 to operation in the polar mode the angular position of shaft 59 is changed from zero to the angle (B) by changing the energization of the resolver windings of the servo mechanism 109 (Fig. 4) to be described later. During the normal mode the rotor 115 is held in the position corresponding to a value of zero for the angle (B), by supplying alternating current to one of the stator windings while the other stator winding is shorted, when the relay 70 is in the position shown in Fig. 4. Since normally the clutch 37 (Fig. 2) is disengaged and the clutch 36 is engaged, the shaft 62 is free to turn while the shaft 61 is under control of the motor 24. The shaft 62 therefore turns to a new position representing the sum of ($H_A$) and (B) to form the true heading angle ($H_T$) in terms of the transverse coordinates. This deflection angle ($H_T$) is added to the drift angle ($\delta$) to form the ground track angle ($G_T$) referred to the transverse coordinate system. The ground track angle ($G_T$) is indicated on the dial 66 and is transmitted to the present position computer by shaft 67.

After the shaft 62 has turned to the position representing the true heading angle ($H_T$), clutch 36 is disengaged and clutch 37 is engaged. This causes the feedback from shaft 34 to pass through clutch 37, differentials 39 and 38, and cam 41 to the synchro shaft 17, leaving it as before in a position representing the uncorrected magnetic heading ($H_m$). In other words, this step mechanically interposes differential 39 between the shaft 34 and the differential 38 to introduce the angle (B). The dial 66 now reads ($G_T$) and is the only one that is changed in going to the polar mode.

As will be seen from subsequent description, the change from normal to polar mode is effected by a system of coordinated relays which in turn are controlled by a single switch 121 operated by a cam on the latitude shaft 85. At the same time that relay 70 is operated to energize the servomechanism 109 to solve angle (B), a delay relay 10 (Fig. 2) is energized which, after a thirty second delay interval energizes relay 15 which disengages magnetic clutch 36 and engages magnetic clutch 37. This gives the servomechanism 109 sufficient time to take up its new position to change the ground track angle from ($G_A$) to ($G_T$) and this angle is introduced back to the present position computer 7 through the mechanical connection 67 (Figs. 2 and 4). It will be clear that as soon as the servomechanism 109 begins to introduce the angle (B) the ground speed components are inaccurate for normal integration and therefore it is essential in order to avoid any significant navigation error that the steady state of the servomechanism 109, of which the resolver 111 is a part, be reached as soon as possible and that the clutching operation occur without disturbing any shaft positions.

When the magnetic compass 11 is in danger of failing, because of proximity to the North or South magnetic poles of the earth, the conductors 14 serving the synchro 13 may be opened by means of switch 68, which may be operated manually or automatically, deenergizing the error signal field winding 16. The feedback loop for the magnetic compass servo is thus opened, but the shaft 17 continues to be positioned under the joint control of the motor of the position servo 32 controlled by the directional gyroscope 31 and the rate servo 25. The ground track angle is represented at the mechanical output connection 64 of differential 63 which is connected to a dial 66 and to a shaft 67 leading to the present position computer 7.

In switching the heading reference unit 6 to operation in the polar mode the angular position of shaft 59 is changed from zero to the angle (B) by changing the energization of the resolver windings of the servo mechanism 109 (Fig. 4) to be described later. During the normal mode the rotor 115 is held in the position corresponding to a value of zero for the angle (B), by supplying alternating current to one of the stator windings while the other stator winding is shorted, when the relay 70 is in the position shown in Fig. 4. Since normally the clutch 37 (Fig. 2) is disengaged and the clutch 36 is engaged, the shaft 62 is free to turn while the shaft 61 is under control of the motor 24. The shaft 62 therefore turns to a new position representing the sum of ($H_A$) and (B) to form the true heading angle ($H_T$) in terms of the transverse coordinates. This deflection angle ($H_T$) is added to the drift angle ($\delta$) to form the ground track angle ($G_T$) referred to the transverse coordinate system. The description of the operation in the polar mode is presented hereinafter under the heading of the polar mode operation.

*Present position computer*

As previously mentioned, the function of the present position computer component 7 is to compute continuously the instantaneous latitude and longitude of the vehicle and to continuously supply this data to the heading reference unit 6 and also to the great circle computer 8. This computer resolves the speed and ground track of the vehicle into north-south and east-west components, then integrates to secure distance in terms of latitude and longitude travelled since the last fix, displays the result as instantaneous latitude and longitude on dials and supplies data mechanically and electrically to the other components. This operation is accomplished as follows:

Referring to Figs. 1, 2, 4 and 5, and assuming the normal mode of operation and the instantaneous position of the aircraft to be at point (A), the ground track azimuth angle of the vehicle ($G_A$) (in terms of geographical coordinates) is received from the heading reference unit 6 as the angular displacement of the shaft 67 from differential 63 and is utilized to position the rotor winding 69 of the resolver 71. The rotor winding 69 is electrically energized through conductor 122 by a voltage received from the radar ground speed component 5. The magnitude of this range ($V_g$) represents the ground speed of the airplane. The resolver 71 has two stationary secondary windings 72 and 73 disposed at right angles to each other. Therefore, with proper regard to the location of the zero position of shaft 67, the input voltage ($V_g$) is resolved into two components, ($V_g \cos G_A$) in secondary winding 72, and ($V_g \sin G_A$) in secondary winding 73. As seen by reference to Fig. 5, in which ($V_g$) represents by its length the speed of the airplane along its ground track having the azimuth angle ($G_A$), the resolution of the speed vector into its cosine and sine components produces vectors 74 and 76 which represent by their lengths the N–S speed and the E–W speed of the airplane, respectively.

Referring again to Fig. 4, the output of resolver secondary winding 72, representing ($V_g \cos G_A$), is applied to a rate servo 77 serving as a latitude integrator. The servo 77 includes an amplifier 78 to which the signal is applied, a motor 79 operated by the amplifier output at a speed directly proportional to the amplitude of the input signal ($V_g \cos G_A$) under the control of a servo loop including the amplifier 78, the motor 79 and the generator 81 driven by the motor 79. Since the shaft speed of the motor 79 is proportional to the input signal voltage magnitude, it is proportional to the instantaneous N–S rate of travel of the vehicle, or $$\left(\frac{dL}{dt}\right)$$

that is, the rate of change of latitude. Also, the angular displacement of the motor output shaft 82 being the integral of its speed, is proportional to the integral of the input signal. This displacement therefore is proportional to the integral of the N–S speed, or at any instant it is representative of the distance travelled in the N–S direction from a pre-selected point which may be represented by a presetting of the appropriate components in terms of latitude referred to the chosen axis of reference, such as the earth's N–S pole axis. This distance is indicated on a counter 83 in degrees and minutes of instantaneous latitude, and an output latitude shaft 85 is provided for connection to other equipment employing the latitude (L), as input.

An initial setting knob 86 connected to the shaft 82 through a differential gear 87 is provided so that before departure, or when a fix is taken during a journey, the output counter 83 and shaft 85 can be set to the latitude of the instantaneous position of the aircraft. Thereafter during the journey the present position computer 7 supplies continuous correction data to the counter 83 and shaft 85, the latter elements changing in accordance with the instantaneous latitude at all times.

Through the differential 87 the output shaft 82 of the latitude integrator 77 is connected by a clutch 88 during the normal mode of operation, that is, for positions below about 60° of latitude, to the output latitude shaft 85, but this clutch 88 is disengaged in the polar mode of operation as will be described in that connection.

The instantaneous longitude of the craft is derived by means of a rate servo integrator 89 whose input voltage, proportional to ($V_g \sin G_A$) representing the E–W speed vector, must be multiplied by (sec L) because the distance in miles equal to a degree of longitude varies in proportion to the cosine of the latitude, being maximum at the equator and zero at the poles.

This multiplication is accomplished in the servo loop of the longitude integrator 89. As pointed out hereinafter in greater detail, during the normal mode of operation, this multiplication is effected by a resolver 91 whose rotor is connected to the output latitude shaft 85 and whose primary winding 913 is excited in series with the secondary winding 73 of the velocity resolver 71, by the generator 92. The generator 92 forms a part of the longitude integrator 89 and the voltage generated by the generator 92 represents $$\left(\frac{dLo}{dt}\right)$$

that is, the rate of change of longitude. The integrator 89 also includes an amplifier 93 and a motor 94 which drives the generator 92. The composite input voltage from the resolvers 71 and 91 is supplied to amplifier 93 through the conductor 124. The output voltage from the generator 92 is supplied through the conductor 95 to the primary winding 913 of resolver 91.

The cooperative action of the resolvers 71, 91 and integrator 89 solves the equation $$Lo=1/60\ (V_g \sin G_A \sec L\ dt) \qquad (2)$$

It will be clear from subsequent description that during the polar mode the secant correction must be supplied by a resolver 91P whose rotor is positively connected to the ($y$) shaft instead of being supplied by the resolver 91.

The integrated longitude changes are thus represented by the angular displacement of the integrator output shaft 96. Assuming the shaft 105 has been set to the longitude of the point of departure, or last fix, by the knob 101, further angular displacement of shaft 105 added by the integrator 89 will represent instantaneous longitude ($Lo$). Shaft 105 is connected through clutch 97 to output longitude shaft 99 during the normal mode of operation. A counter 98 is connected to shaft 99.

Using known values of magnetic variation, a three-dimensional cam 103 is constructed that represents variation as a function of latitude and longitude. Thus any point on the surface of the cylindrical cam 103 represents by its radial dimension the magnetic variation at a latitude and longitude represented, respectively, by the longitudinal and circumferential coordinates of this point on the cam. The cam 103 is rotated by the longitude shaft 99 through a sliding driving connection 90. This cam is moved laterally by means of a nut 103′ which screw-threadedly engages shaft 84′ driven by the latitude shaft 85. The nut 103′ is rotatably connected to cam 103 by a collar which engages an annular recess in the left end of the cam. Relative rotational movement between the shaft 84′ and the nut 103′ causes the cam 103 to be moved laterally in accordance with latitude changes while the cam 103 is rotated in accordance with changes in longitude by the longitude shaft 99 through the mechanical connection 90.

A cam follower 104 engages the surface of the cam 103 and communicates its pivotal motion in the form of angular rotation of the shaft 46. This shaft 46 introduces magnetic variation to the differential 38, Fig. 2.

The previously mentioned earth rate correction to be applied to the directional gyro 31 through the servo 25 to compensate for the rotation of the earth relative to the gyroscope is generated by a resolver 106 driven by the output latitude shaft 85, Fig. 4. The rotor primary winding 106′ of the resolver 106 is excited by a constant potential representing by its magnitude the sidereal rate of rotation of the earth ($\omega_e$), and the position of the rotor primary 106′ is determined by the displacement of the longitude shaft 85 representing instantaneous latitude. Accordingly, a voltage representing ($\omega_e \sin L$) is generated in one secondary winding 107, which is connected in series, through the conductor 21, with the stationary secondary windings 912 and 91P–2 of resolvers 91 and 91P, respectively. The composite output voltage from windings 912 and 91P–2 is supplied through the conductor 19 to the adding unit 18, see Fig. 2, and thence to the control circuit 22 for the motor 24 of the servo 25, previously described.

The stationary quadrature secondary windings 913 and 91P–3, of the resolvers 91 and 91P, respectively, generate respective voltages representing, selectively, the instantaneous rates of change of longitude of the instantaneous position of the vehicle, the first in terms of true longitude and the other in terms of transverse longitude so that the output conductor 19 supplies a voltage representing $$\left(\frac{dLo}{dt}\cdot\sin L\right)$$

to the adding unit 18, Fig. 2, during the normal mode and during the polar mode supplies a voltage representing $$\left(\frac{dx}{dt}\cdot\cos y\right)$$

These quantities provide the longitude rate correction data for the directional gyroscope 31. It should be mentioned here that although the primary windings 911 and 91P–1 are connected in series and the resolver 91 is operated by the latitude (L) shaft 85, while resolver 91P is operated by the ($y$) shaft 139, the respective primaries are selectively energized through the switch 80 so that when the primary of one is energized, that of the other is shorted so that the latter presents low impedance. Accordingly, the longitude rate correction supplied is in terms of geographical or transverse coordinates depending upon which primary is energized.

As previously mentioned, the angle (B), that is, the angle between the geographical meridian and the transverse meridians, is introduced to the heading reference unit 6 (Fig. 2), through the shaft 59 that is rotated by the servomechanism 109 (see Fig. 4). Since in the normal mode of operation the transverse coordinates are not employed, the angle (B) in this mode must be zero. This angle is made zero in the following manner. The servomechanism 109 consists of a resolver 111 having a rotor winding 115 which energizes a motor 113 through an amplifier 112, the resolver 111 also having two quadrature stator windings 114 and 116. The windings 114 and 116 are energized, respectively, through conductors 117 and 118 and the energization of these windings is controlled by double-pole double-throw relay 70. When the relay 70 is in the position shown in Fig. 4 for normal mode operation both terminals of winding 116 are connected to ground while the ungrounded end of winding 114 is connected to a suitable source 120 of alternating current causing the resolver and servo shaft 59 to take a specific position representing the zero value for angle (B).

The change from normal to polar mode of operation of the heading reference unit 6 and the present position computer 7 is controlled automatically by a switch 121 operated by a cam 125 on the output latitude shaft 85 when the vehicle passes above an arbitrary latitude, in the present instance, approximately 60° N or S. The switch 121 controls the energization of appropriate relays including relays 10, 70 and 80, already mentioned, which in turn control the several electrical and mechanical components as hereinafter described.

*Polar mode*

For reasons already mentioned, integrators have a limited range of accuracy and the present invention provides a specially designed computer system in which the integration coordinate system is automatically changed when the vehicle approaches either pole of the earth although the output, that is, the position indication, continues to be in terms of geographical coordinates. This new coordinate system is termed the transverse coordinate system previously mentioned and preferably has its poles displaced 90 degrees from the poles of the geographical coordinate system.

A clearer understanding of the present invention may be had by appreciating the fact that the transverse coordinate system is just like the ordinary latitude-longitude system except that it is rotated 90° so that its "North Pole" is on the Equator at the date line and its "South Pole" is on the Equator at the Greenwich meridian. The zero meridian of the transverse system goes through the true North Pole and its 180th meridian goes through the true South Pole. Thus the transverse longitude $(x)$ is zero at the North Pole and increases positively to 180° at the South Pole by way of Asia and negatively to 180° by way of America. Another way of saying this, which is algebraically the same, is that $(x)$ increases from zero to 360° going south by way of Asia and north by way of America. The transverse latitude $(y)$ is zero at both true poles and along the 90th East and West meridians, and increases positively to 90° at the date line-Equator point, and negatively to −90° at the Greenwich meridian-Equator point.

It should also be understood that the transverse system chosen may be one which is rotated by a selected amount other than 90°, or one which is rotated in the other direction from the geographical system. In such latter instances the same general principles of operation would be applicable but the phasing of the components would have to be appropriately changed.

Figure 6A:
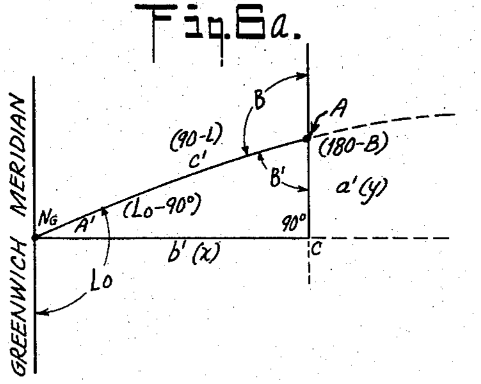
Figure 6:
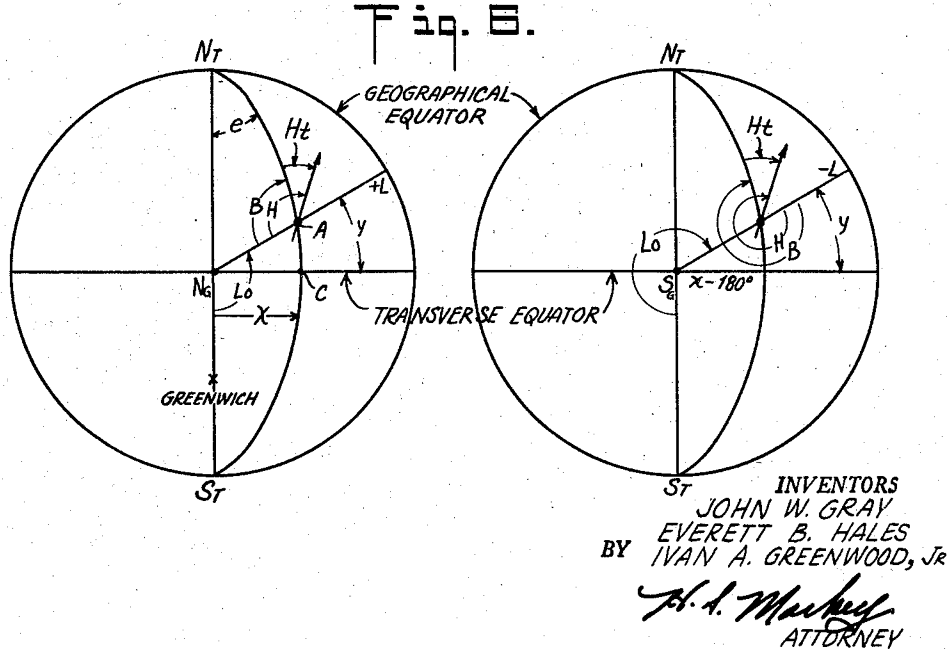

The computer 7 is especially designed to solve a set of equations for transformation from the conventional geographical coordinates to the selected transverse coordinates and to position one set of shafts in terms of one system and another set in terms of the other system so that either mode of operation can be instituted at any time without introducing navigation errors. These equations are derived from standard trigonometric equations for spherical right triangles such as the navigation triangle in Figs. 6 and 6*a*, showing the relation between the geographical and transverse coordinate systems. The triangle in Fig. 6*a* is an enlargement of triangle (NAC) of Fig. 6. The prime letters represent a spherical triangle on the earth's surface as laid on the geographical coordinates. The present or instantaneous position of the aircraft is indicated at (A), which has the indicated geographical position coordinates (L) and (L*o*), measured with respect to the Greenwich meridian and the Equator, respectively. The transverse coordinate system has its prime meridian in coincidence with that of the geographical system, but the transverse South Pole, designated $(S_T)$, is at the intersection of the Greenwich meridian and the geographical Equator. The "transverse North Pole" $(N_T)$ is at the intersection of the geographical Equator and the 180th geographical meridian. The transverse Equator coincides with the geographical 90° meridian circle. The angle between meridians common to the two systems at point (A) is indicated as the angle (B). The angular distance $(y)$ measured from (A) along its transverse meridian to the transverse Equator is defined as the transverse latitude, and the angular distance $(x)$ measured from (A) to the transverse prime meridian circle is defined as the transverse longitude.

From what has already been said it should be apparent that the present invention is basically a dead-reckoning system, the instantaneous position being determined by continuously resolving the ground speed vector into two components in the geographical coordinate system and integrating the velocity components. During the travel over most of the earth's surface, that is, below approximately 60° North and South latitude, during which the integration is performed directly in terms of the geographical coordinates, the resolving angle is the true ground track angle $(G_A)$ which is the angle the ground velocity vector makes with the geographical meridian. Thus the two velocity components are $(V_g \sin G_A)$, the rate of change of longitude; and $(V_g \cos G_A)$, the rate of change of latitude. The longitude component $(V_g \sin G_A)$, or rate of travel East (negative is West) differs from the true longitude rate except at the equator due to the convergence of meridians, and therefore it must be divided by the cosine of latitude to obtain the true value. The continuous integration of the latitude and longitude changes give the instantaneous position data. Because of the convergence of the meridians at the earth's poles, the longitude rate increases at excessive rates near the earth's poles and it is for this reason, as previously mentioned, that it is essential for accurate navigation as the earth's poles are approached to use another coordinate system whose poles are located at a substantial distance from the earth's poles.

As previously mentioned, the computer 7 is automatically switched to integration in the new coordinate system at a preselected value of latitude. Therefore, in order to provide continuous accurate instantaneous position data it is necessary to provide the correct starting values, that is, constants of integration, when the system starts to integrate in terms of the new coordinate system. The new resolving angle is the difference between the true ground track $(G_A)$ and the angle (B). The angle (B) for an instantaneous position (A) of the aircraft and the corresponding coordinates $(x)$ and $(y)$ of the new coordinate system is shown in Fig. 6*a*.

In order to have instantaneous position data available at all times in terms of the geographical coordinate system, and in order to have the components properly positioned at the instant of switching from one system of coordinates to another, the present system continuously computes the $(x)$ and $(y)$ coordinates from the geographical coordinates during the normal mode of operation and during the polar mode continuously computes the instantaneous angle (B) and the true latitude and longitude from the corresponding $(x)$ and $(y)$ coordinates.

During the normal mode, the angle (B) is zero and the (B) resolver 111 is held in the zero position by the appropriate electrical configuration as previously mentioned. During the polar mode $$B = G_A - G_T \qquad (3)$$

Referring to Fig. 6*a*, the trigonometric relations between the angles and sides of the spherical triangles involved in the transformation between the two coordinate systems are indicated, where the angle (C) is a right angle. In such a right triangle the following relationships exist.

$$\sin a' = \sin A' \sin c' \qquad (4)$$

$$\sin b' = \sin B' \sin c' \qquad (5)$$

$$\cos c' = \cos a' \cos b' \qquad (6)$$

$$\cos A' = \sin B' \cos a' \qquad (7)$$

$$\cos B' = \sin A' \cos b' \qquad (8)$$

Combining Equations 5 and 7 gives $$\cos a' \cos B' = \sin A' \cos c' \qquad (9)$$

Combining Equations 4 and 6 yields $$\cos a' \sin b' = \cos A' \sin c' \qquad (10)$$

Applying (7) and (9) to the right triangle of Fig. 6a, where $$x=b'$$
$$y=a'$$

Co-latitude $(90-L)=c'$ and $(180-B)=B'$, gives $$\cos y \sin B=\sin Lo \qquad (11)$$
$$\cos y \cos B=\cos Lo \sin L \qquad (12)$$

Equations 11 and 12 may be reduced to $$\tan B=\frac{\tan Lo}{\sin L} \qquad (13)$$

Equation 13 immediately suggests the solution of the angle (B) by resolvers which are controlled in accordance with true latitude and longitude changes.

The complete circuit diagram of the present position computer 7 is shown in Figure 4, but for the purposes of facilitating explanation, the different configurations which are effected automatically by the appropriate switches at the appropriate times, are shown schematically in Figures 4a, 4b and 4c, respectively.

The configuration of the computer 7 for solving angle (B) is shown in Figure 4a. Similarly, Figure 4b illustrates the configuration for solving the transverse coordinates ($y$) and ($x$) from latitude (L) and longitude (L$o$), respectively. The configuration of the computer 7 for computing latitude (L) and longitude (L$o$) from the transverse coordinates ($y$) and ($x$) respectively, is illustrated schematically in Figure 4c.

Referring to Fig. 4a, the automatic computation of angle (B) is accomplished by two input resolvers 150 and 151 and the output resolver 111 which is controlled by a servo feedback loop including a stator winding 115, a servo amplifier 112, and motor 113 which drives the output resolver 111. The resolver 111 is a component of the servo-mechanism 109. Input resolver 150 is driven at 1 to 1 ratio by the longitude output shaft 99 and the resolver 151 is driven at 1 to 1 ratio by the output latitude shaft 85. The rotor 150′ of the longitude resolver 150 receives 400 cycle excitation from a suitable source represented by the leads 153 and is phased so that its two stator windings yield output voltages proportional, respectively, to ($\sin Lo$) and ($\cos Lo$). The ($\cos Lo$) voltage is used to excite the rotor of the latitude resolver 151 which is phased so that one of its stator windings produces the product of this excitation by ($\sin L$). This output ($\cos Lo \sin L$), and the ($\sin Lo$) output of the other stator winding of the longitude resolver 150 are supplied to the rotor windings 114 and 116 of the (B) resolver 111 and the position taken by the rotor as a result of servo action represents the angle (B). However, for the purpose of analyzing the servo action the actual position of the rotor shall be referred to as ($\theta$). The output voltage of the stator winding 115 of the resolver 111 is $$e_B=\sin Lo \cos \theta-\cos Lo \sin L \sin \theta \qquad (14)$$

Substituting for values from Equations 11 and 12

$$e_B=\cos y\ [\sin B \cos \theta-\cos B \sin \theta]$$
$$\cos y \sin (B-\theta) \qquad (15)$$

As indicated in Figure 4a this output voltage ($e_B$) is applied as an error signal to the servo amplifier 112 which energizes the motor 113 which in turn controls the position of the rotor 115 within the limits of accuracy of the servo in accordance with the usual practice.

For a given set of mechanical inputs to the resolvers 150 and 151, i.e., values of longitude and latitude, respectively, straight-line variation of ($\theta$) will produce a sinusoidal variation of ($e_B$) having a maximum value of ($\cos y$), and two zeros, one at $\theta=B$ and one at $\theta=B+180°$. The resolver 111 and its associated feedback servo loop is sensed to decrease ($\theta$) if ($e_B$) is negative and increase ($\theta$) if ($e_B$) is positive. This gives two possible values of ($\theta$) where the error signal will be (0), which will be 180° apart, but the resolver 111 will always be driven away from the unstable null, which is at $\theta=B+180°$ and toward the stable null at $\theta=B$. The gain of the servo amplifier 112 is such that whenever the error signal, that is, $(B-\theta)$ is at least two or three minutes of arc, sufficient voltage will be delivered to the motor 113 to cause it to overcome the static friction and thereby decrease the error indication. Since the amplitude of the sine curve of the error signal as a function of $(B-\theta)$ is ($\cos y$) the sensitivity of the signal in volts per degree of error in the neighborhood of the null is proportional to the ($\cos y$). Since automatic computation of the angle (B) is needed only in the polar areas where transverse latitude ($y$) is always between minus and plus approximately 30°, ($\cos y$) is always between (1) and +.866. It is for this reason that the sensitivity does not vary enough to impair the overall accuracy.

It has been previously mentioned that the angle (B) is fixed at zero while navigating in other than the polar areas. At all times the instantaneous position of the vehicle is determined by dead reckoning and while the craft is in other than the polar regions the integration is directly in terms of latitude and longitude. However, because of the convergence of the meridians in the vicinity of the poles of the earth, it is necessary to use the transverse coordinate system in areas near the poles and accordingly in the areas other than the polar regions, it is necessary to continuously compute ($x$) and ($y$) from the true latitude and longitude, respectively, so that the transverse coordinates ($x$) and ($y$) will have the correct starting values, i.e. constants of integration, at any time the polar mode of operation is initiated.

If Equations 4 and 10 are applied to the right triangle of Figure 6a they become $$-\sin y=\cos L \cos Lo \qquad (16)$$
$$\cos y \sin x=\cos L \sin Lo \qquad (17)$$

These equations are solved by the resolvers and servos of Figure 4b. In the case of the computation of ($x$) and ($y$) the latitude resolver 106 has a rotor winding 106′ energized by a 400 cycle A.C. supply represented by the leads 154 and the stator secondaries develop voltages representing ($\cos L$ and $\sin L$). As previously explained the ($\sin L$) voltage from secondary 107 is used in the gyro correction servo. The ($\cos L$) voltage from secondary 108 is used to energize the rotor primary of a longitude resolver 161 through the amplifier 190. As in previous instances the resolvers 106 and 161 are positively driven in 1 to 1 ratio by the latitude and longitude shafts, respectively. The longitude resolver 161 is provided with stator windings which yield ($\cos L.\cos Lo$) and ($-\cos L \sin Lo$) by reason of the positioning of its rotor by the (L$o$) shaft. These latter voltages are added to the outputs of resolver 162 on the ($y$) shaft 139 and the resolver 163 on the ($x$) shaft 143, respectively producing error signals to control the ($y$) and ($x$) servos in such a way as to solve Equations 16 and 17.

For the purpose of analyzing the action of the servos, let ($\phi_x$ and $\phi_y$), respectively, be the actual positions of the ($x$) and ($y$) shafts. Therefore, for ($\phi_y$) mechanical output of the ($y$) resolver 162, its electrical error signal supplied to the ($y$) servo amplifier 164 and associated motor 166 is $$e_y=\cos L \cos Lo+\sin \phi$$
$$=\sin \phi_y-\sin y \qquad (18)$$

As in the usual case of resolvers, the ($y$) resolver 162 has two zero positions but it is so sensed that the stable null is where the slope of the error curve is positive. In other words, when ($e_y$) is negative the motor 166 tends to increase ($\phi_y$), and vice versa. This servo causes ($\phi_y$) to equal ($y$) as determined by latitude and longitude within the limits of the servo, and the apparent ambiguity in Equation 16 is avoided because ($y$) is never outside of the limits of above −90° and below +90°. The slope of the error at the null is variable and differentiation of Equation 18 shows that it is proportional to (cos $y$) which varies only from +0.866 to +1 within the polar regions and accordingly the accuracy of the servos is not appreciably impaired.

When the ($y$) servo 162 is at equilibrium the (cos $\phi_y$) output equals (cos $y$). A voltage representing (cos $y$) is supplied by the ($y$) resolver 162, to the rotor winding of the ($x$) resolver 163 and the voltage supplied by its stator winding is (cos $y$ sin $\phi_x$). This voltage is combined with the (−cos $L$ sin $Lo$) output of one of the windings of the longitude resolver 161 to yield the error signal voltage ($e_x$) which is supplied to the ($x$) servo amplifier 167 to energize the motor 168. This error signal voltage is $$\begin{aligned} e_x &= \cos y \sin \phi_x - \cos L \sin Lo \\ &= \cos y\ (\sin \phi_x - \sin x) \end{aligned} \quad (19)$$

The function of ($\phi_x$) for different values of (sin $x$) as determined by (L) and (L$o$) gives a sine curve with two nulls which are 180° apart as in the case of the other resolvers. When ($x$) is greater than −90° and less than +90° corresponding to the Northern Hemisphere the slope at the null is positive; in the Southern Hemisphere where ($x$) is between 90° and 270°, it is negative. The ambiguity which is obvious from Equations 16 and 17 could be resolved in at least two ways. In the preferred form, as shown in Fig. 4, a micro-switch 169, which is operated by a cam 171 on the latitude output shaft, distinguishes between the hemispheres.

An alternative arrangement would be to employ instrumentation for solving a third equation $$\cos y \cos x = \cos L \sin Lo \quad (20)$$

However, this latter method would require an additional resolver-driving amplifier and it is desired to keep the weight and complexity of this navigation system to a minimum.

The hemisphere switch 169 controls the ($x$) servo 163 so that in the Northern Hemisphere the servo is sensed to increase ($\phi_x$) if ($e_x$) is negative, and vice versa, so that the ($x$) resolver shaft will be turned to the appropriate arc-sine of the given value of (sin $x$). In the Southern Hemisphere the switch 169 reverses the sensing of the servo control causing the servo 163 to select the other arc-sine.

The sensitivity of the error signal at the null is found by the differentiation of Equation 19 to be proportional to (cos $y$ cos $x$) which, from Equation 5 will be seen to be equal to (sin $L$). Around the periphery of the polar area the coordinate ($x$) must be accurately determined by the ($x$) servo 161 because this is the area of transition between the normal and polar mode.

Figure 4$c$ shows the configuration for converting the ($x$) and ($y$) coordinates into terms of (L$o$) and (L) coordinates, respectively. The same resolvers are used in this computation as are used in translation in the opposite direction, although the connections are different and in addition thereto an additional resolver 147 driven by the longitude shaft is utilized. It will be apparent from Equations 15 and 16 that when the ($x$) and ($y$) error signals in the configuration of Figure 4$b$ are zero, the positions of the longitude shaft 99 and the latitude shaft 85 correspond to the positions of the ($x$) and ($y$) shafts, respectively. However, a question arises as to which error signal is applicable to each servo and how each servo control should be sensed so that it will reduce its error toward zero instead of increasing it. This can be determined by effectively rotating the coordinates of the ($x$) and ($y$) error signals by means of a resolver on the longitude shaft 99. The resolver 147 performs this function.

It will be noted that the configuration of Figure 4$c$ is the same as that of Figure 4$b$ up to and including the utilization of the signals ($e_x$) and ($e_y$). However, instead of the voltages ($e_x$) and ($e_y$) energizing servos for positioning the respective ($x$) *and* ($y$) shafts, these voltages are applied as indicated on the circuit diagram to the rotor windings of the resolver 147. One of the stator windings of the resolver 147 which yields the latitude error voltage ($e_L$) is connected to energize the latitude servo amplifier 164 and its associated motor 166 to position the latitude output shaft 85. Similarly, the voltage from the other stator winding of the resolver 147 energizes a servo amplifier 167 and associated servo motor 168 to position the output longitude shaft 99. In order to increase the inherent inaccuracies in the instrumentation of this configuration, a suitable gain control including a variable gain amplifier 179 is provided, the operation of which will be described hereinafter.

In analyzing the operation of this configuration, let the respective actual positions of the latitude and longitude shafts be represented by ($\phi_L$) and ($\phi_{Lo}$), respectively, while (L) and (L$o$) refer to the theoretical values of ($y$) and ($x$), respectively, as given by Equations 16 and 17. In these terms the error signals become $$\begin{aligned} e_x &= \cos y \sin x - \cos \phi_L \sin \phi_{Lo} \\ &= \cos L \sin Lo - \cos \phi L \sin \phi_{Lo} \end{aligned} \quad (21)$$

$$\begin{aligned} e_y &= \sin y + \cos \phi_L \cos \phi_{Lo} \\ &= \cos L \cos Lo + \cos \phi_L \cos \phi_{Lo} \end{aligned} \quad (22)$$

These signals excite the respective rotor windings of the resolver 147 as indicated in Figure 4$c$ and the respective output voltages of the stator windings of the resolver 147 are $$e_{Lo} = -e_x \cos \phi_{Lo} - e_y \sin \phi_{Lo} \quad (23)$$

$$e_L = -e_y \cos \phi_{Lo} + e_x \sin \phi_{Lo} \quad (24)$$

Combining Equations 21 and 22 with 23 and 24 gives $$e_{Lo} = \cos L \sin (\phi_{Lo} - Lo) \quad (25)$$

$$e_L = \cos L \cos (\phi_{Lo} - Lo) - \cos \phi_L \quad (26)$$

The longitude servo 161 is sensed so that when ($e_{Lo}$) is negative the servo motor 168 will be driven so that ($\phi_{Lo}$) is increased, and vice versa.

Although it will be clear from Equation 25 that ($e_{Lo}$) has two nulls, 180° apart ($\phi_{Lo}$) will always be servoed to (L$o$) since (cos L) is always positive.

When ($\phi_{Lo}$) is approximately equal to (L$o$), cos ($\phi_{Lo} - Lo$) is +1 and Equation 26 becomes $$e_L = \cos L - \cos \phi_L \quad (27)$$

This equation has two nulls, and as in the case of the ($x$) servo 168, depends upon the hemisphere which is automatically selected by the switch 169, as previously described. In the Northern Hemisphere the servo control is such that a negative error signal causes ($\phi_L$) to increase while the reverse condition is true in the Southern Hemisphere.

The slope of the error curve at null is proportional to (sin L) which varies between 0.866 and 1 in the polar areas so that the servo sensitivity is very satisfactory. On the other hand, the longitude servo sensitivity is proportional to (cos L) which is clear from Equation 25. This shows that the sensitivity is approximately proportional to the distance from the earth's poles in either polar area. The nearer a pole of the earth is approached the less accurate the longitude need be indicated to locate a position with a given precision.

In spite of the logic of the proportionality of the sensitivity to (cos L), it is desirable to maintain the sensitivity at the highest practicable value in order to keep the longitude indicator from seeming sluggish and erratic in the vicinity of either of the earth's poles. This is accomplished by the auxiliary variable gain amplifier 179 which is between the ($e_{Lo}$) output of the resolver 147 and the usual servo amplifier 167 which energizes the servo motor 168. The gain of the amplifier 179 is controlled by the magnitude of the cosine voltage output of the latitude resolver 106 in such a way that it is roughly proportional to the reciprocal of (cos L) over a wide range. This tends to cause the sensitivity in volts per degree of latitude at the servo amplifier to be constant although it must become zero at either of the earth's poles because a variable gain amplifier cannot have infinite gain.

It will be apparent from the above that several changes in circuits must be effected simultaneously in switching from one mode to another. Because the arc-tangent solution giving the latitude of instantaneous position (geographical or transverse) is of opposite sign in the two hemispheres, it is necessary that the servomotors 166 and 168 be reversible. Also the variable gain amplifier 179 is needed only during the polar mode of operation. It is also clear that the same servos are used to translate from (L*o*) and (L) to (*x*) and (*y*) coordinates, and vice versa. Accordingly, a system of relays are provided, which are controlled by cam operated switches on the latitude shaft 85 for effecting coordinated change in the electrical and mechanical configuration of the various elements when changing from one mode to the other and when passing from one hemisphere to the other.

To this end, polarized relays are used throughout to accomplish the coordinated control and for convenience, the relay contacts are so connected that the components are put in the configuration for normal mode of operation in the Northern Hemisphere when the relay armatures are in their normal polarized positions as indicated in Fig. 4. This condition obtains when cam-operated switch 121 is in the open position and the cam-operated switch 169 is in the (NH) position, as shown. Closing of the switch 121 energizes the solenoid winding of relays 10, 30, 40, 50, 60, 70, 80 and the magnetic clutches 88, 97, 141 and 144. It will be apparent from Fig. 4 that the armature of the magnetic clutches are polarized so that when their solenoids are not energized the sections of the clutches are in the respective positions as shown. This corresponds to normal mode of operation. When the solenoids are energized the clutches are moved to their alternate positions. If the switch 169 is in the (NH) position at the same time that switch 121 is closed the solenoid winding of relay 15 would be energized and the contacts of the latter would be in the position opposite to that shown in Fig. 4 to reverse the rotation of the servomotor 166. When the switch 169 is in position (SH) with switch 121 open the solenoid of relay 25 will be energized to reverse the position of its contacts from that shown in Fig. 4, while with switch 169 in (SH) position and switch 121 closed, the contacts of relay 25 will again be in the position shown in Fig. 4, it being understood that the reversing of the contacts of the relay 25 reverses the direction of rotation of the servomotor 168.

When the contacts of relay 40 are in the position shown corresponding to the normal mode, it applies a constant bias on the amplifier 179 to give a fixed gain. The alternate positions of the relays 50 and 60 produce the alternate configurations of Figs. 4*b* and 4*c*.

The sequence of the operation of switches 121 and 169 will be understood from the previous description together with the subsequent general summary.

*General summary of the operation of basic data components*

From the foregoing description it will be apparent that the present invention provides an automatic navigation system which is capable of continuously determining the instantaneous position of an aircraft as it flies over the earth's surface. Because of the curvature of the earth's surface, convergence of the meridians of the conventional geographical coordinate system near the poles of the earth causes the longitude rate to change very rapidly as the earth's poles are approached and for this reason it is desirable to provide a navigation system in which a second coordinate system having a predetermined relation with respect to the geographical coordinate system may be used in such a way that the longitude rate is kept low enough that integrating devices can accurately keep step with the rates.

The general manner in which the components of the heading reference unit 6 and the present position computer 7 cooperate in providing the instantaneous position data in terms of the conventional geographical coordinate system during the normal mode of operation has been described above. It is now necessary to describe how the system is transformed to operation in terms of a new coordinate system, herein termed the transverse coordinate system, while still continuing to indicate instantaneous position in terms of the conventional geographical coordinates without any appreciable error.

It has been explained how the device is a dead-reckoning system which resolves the velocity vector into orthogonal components in terms of the particular coordinate system in which it is operating at the time and continuously integrates these velocity components in order to give the instantaneous position of the aircraft. Also, the preceding description has explained the mathematical transformation for translating the terms indicating the position in one coordinate system into terms of the other coordinate system. It has also been shown that during the normal mode of operation the resolving angle is the true ground track angle, that is, the path of the aircraft measured with respect to true North while during the so-called polar mode of operation the resolving angle is measured with respect to one of the poles of the new coordinate system. The manner in which the system is capable of transferring from one mode of operation to the other without appreciable error is one of the salient features of the invention.

For purposes of clarification not all of the automatic controls are shown because the complexity of the complete circuit diagram would detract from the novel features of the navigation system. Such a design of an automatic control system is well within the knowledge of those skilled in the electrical control art, in the light of the desired functions of the system which are set forth herein. For that reason only so much of the automatic control system is shown as is most essential to avoid significant errors. It is to be clearly understood that the accuracy of the system depends upon the production of a substantially uninterrupted flow of data. The system is so arranged that from time to time when it may be desirable to verify the position of the craft as determined by the navigation system, as by visual or celestial observation, means are provided for inserting any corrections which might be necessary thereafter permitting the system to automatically compute from the constants represented by the correction data.

Because points on the earth are located in terms of the conventional geographical grid system, this system is used as one of the basic coordinate systems and when the other coordinate system is used positions are always converted into terms of the geographical system. However, it should be clearly understood that the capabilities of the invention make it possible to utilize any arbitrary systems desired so long as there is a known relation between the different grid systems. In describing the operation of the system it will be assumed that the point of departure is at a point on the earth between approximately 60° North and South latitude where the system operates in the normal mode. For the purpose of facilitating explanation, the relative values representing the trigonometric functions developed in the resolvers and applied to the servos are indicated on the conductors and the direction of the flow of energy is indicated by the arrow heads. Also, in the mechanical components the letter (N) is used to designate the position of the mechanical elements during normal mode and the letter "P" represents the position of the elements during the polar mode.

Assuming then that the point of departure is below approximately 60° latitude, it will be usual that the magnetic compass will give the correct magnetic North indication while the direction gyro 31 may or may not be in a corresponding position. Accordingly, before departure and after setting in the latitude and longitude of the point of departure by means of the control knobs 86 and 101 respectively, it will be necessary to slew the heading shaft 44 (Fig. 2) to a position corresponding to the magnetic compass 11. Accordingly, as previously explained, a special fast slewing gear train 47 may be interposed in the compass servo through the clutch 50 loop by manipulating knob 49. As soon as the position of the heading shaft 44 is slewed to a position corresponding to the magnetic compass 11 the clutch 50 is manipulated and the slow speed gear train 48 is substituted for the gear train 47 in the compass servo loop. Also before departure, the latitude and longitude of the point of destination is also set in by manipulation of the knobs 176 and 177, respectively, see Figs. 1 and 8.

Before latitude of approximately 60° is reached, that is, when the cam 125 on the output latitude shaft 85 has not closed the switch 121, the relays 10, 15, 20, 30, 40, 50, 60, 70 and 80 are in the deenergized positions indicated in Figures 2 and 4, to which their contacts are spring-biased. It will be seen from the circuit diagram that the winding of the magnetic clutch 36 will be energized through the contact of the relay 20. Also, the position of the contacts of the relay 70 causes the energization of stator winding 114 of the resolver of the servo mechanism 109 at the same time that the other stator winding 116 of the resolver is shorted, thus, holding the rotor in a fixed position corresponding to a value of zero for the angle (B). The winding 114 is energized by a constant voltage of alternating current source 120 which has a frequency of 400 cycles, which frequency is standard throughout the electrical equipment except for the frequency of the flux gate compass which is 800 cycles, as previously explained. Thus, as previously explained the heading reference unit will supply through the differentials 39 and 63 an angular deflection of the shaft 67 which corresponds to the true heading of the vehicle referred to true North as represented by ($G_A$).

In resolving the ground speed into the two velocity components the position of the shaft 67 controls the position of the rotor winding 69 of the resolver 71, while this winding is simultaneously energized through the conductor 122 by a voltage of $V_g$ from the radio echo measuring component 5. The resolver 71 accordingly delivers an output voltage from its winding 72, which is equal to ($V_g$ cos $G_A$), representing the north-south velocity component and delivers from its other quadrature winding 73 a voltage ($V_g$ sin $G_A$) representing the east-west velocity component of the aircraft (see Fig. 5). At the same time that clutch 36 is engaged, the left hand side of clutch 88 is engaged to connect resolver 91 directly to latitude shaft 85, and the right hand side of clutch 97 is engaged to provide a direct mechanical drive between the integrating rate servo 89 and the output longitude shaft 99. For reasons which will appear later the integrator 77 integrates directly in terms of latitude and accordingly its instantaneous position during operation represents instantaneous latitude. However, during the polar mode of operation the integrator 77 integrates in terms of the transverse coordinate system and the instantaneous position of the output of integrator 77 is translated into geographical coordinates by the system of servo loops described.

As previously mentioned, it is necessary to modify the longitudinal rate because of the convergence of the meridians at the poles. Accordingly, two resolvers 91 and 91P are provided, having stator secondary windings 913 and 91P–3, respectively, connected in series with the secondary winding 73 of the resolver 71. The resolver 91 is positively driven at a one to one ratio by the output latitude shaft 85 while the resolver 91P is positively driven by the ($y$) shaft 139. The primaries 911 and 91P–1 of the respective resolvers 91 and 91P are adapted to be alternately connected by means of conductor 95 in the output circuit of the generator 92 of the longitude integrator 89. The double pole relay 80 is adapted to alternately energize one of the primary rotor windings of respective resolvers 91 and 91P at the same time the primary of the other resolver is short-circuited so that the latter presents a low impedance. In the position of the double pole relay 80 shown in Figure 4, the rotor primary of resolver 91 is connected in the output circuit of the generator 92 and the primary of the other resolver 91P is shorted. The resolvers 91 and 91P are so phased that the two respective secondary windings connected in series with the secondary 73 of the resolver 71 provide the cosine function correction of the longitude rate so that the respective resolvers 91 and 91–P supply the appropriate voltage to balance the output of the generator 92 of the longitude integrator 89.

The resolvers 91 and 91P are each provided with respective sine component stator windings 912 and 91P–2 in quadrature to the other set of secondary windings and are connected in series with the sine component stator secondary winding 107 of resolver 106 which is positively connected to the latitude shaft 85 at all times. Accordingly, the longitude correction rate for the directional gyro 31 is furnished by a joint action of the integrators 77, 89 and the resolvers 91 and 91P, the latter of which depends upon the mode of operation. To this end, when the double pole relay 80 is in the position shown in Figure 4 the secant correction is supplied by the resolver 91 which is positively driven by the output latitude 85 and during the polar mode of operation when the double pole relay 80 is in the other position the secant correction is supplied by the resolver 91P which is positively driven by the ($y$) shaft 139. Similarly, the longitude rate correction is supplied by resolver 91 during the normal mode of operation and by the resolver 91P during the polar mode of operation.

The longitude integrator 89 includes servo amplifier 93 which amplifies the composite voltage supplied by the secant correction resolvers and the velocity resolver 71 to energize the motor 94 which operates at a speed proportional to the longitude rate of the aircraft. The east-west velocity component is ($V_g$ sin $G_A$) during the normal made and ( $V_g$ sin $G_T$) during the polar mode. The output of the A.C. generator 92 which is driven by the motor 94 is proportional to $$\left(\frac{dLo}{dt}\right)$$

during the normal mode of operation and is proportional to $$\left(\frac{dx}{dt}\right)$$

during the polar mode of operation which is supplied through the conductor 95 and through the cosine stator secondaries 913 and 91P–3 of the resolvers 91 and 91P, respectively. Thus the motor 94 is caused to rotate at a rate equal to the rate of change of the longitude of the aircraft position.

The longitude rate correction voltage supplied by the resolver 91 during the normal mode and by the resolver 91P during the polar mode is $$\left(\frac{dLo}{dt}\sin L\right) \text{ and } \left(\frac{dX}{dt}\sin y\right)$$

respectively, and this voltage is added to the earth correction rate voltage from the sine winding 107 of the resolver 106 to give a voltage proportional to ($\omega_e$ sin $L$) during the normal mode of operation and ($\omega_e$ sin $y$) during the polar mode. This composite correction voltage is applied through conductor 19 to the adding unit 18 (Fig. 2) where it is combined with the servo error voltage from the magnetic compass servo loop. The output of the adding unit 18 controls the gyro rate correction servo 25. The gyro correction at all times reduces the apparent drift of the directional gyro 31 to a value sufficiently low so that the residual error can be servoed out without any significant overall error in the system. The gyro correction rate and the drift angle are combined to indicate the instantaneous direction of travel and this direction information is utilized by the present position computer 7 (see Figure 1) to calculate the true instantaneous position and the amount of travel. In other words, the navigation system as illustrated in Figs. 1, 2 and 4 may be described as two mutually dependent servo loops; (1) the compass servo loop including the synchro 13, the servo 25, servo 32 and the clutch 36; and, (2) the servo loop comprising the mechanical output of the first servo loop, the electrical output of the velocity resolver 71 and the latitude and longitude integrators, 77 and 89, respectively, back through the adding unit 18, the servo 25 and the clutch 36. Both of these mutually dependent servo loops are dependent upon accurate speed and drift data from the radio echo speed and direction measuring unit 5 and the compass heading data. It might also be considered that the above two loops are included in a third servo loop which includes the course computer 8 to be described later and the pilot or autopilot steering the vehicle to maintain the indicated course.

distance to destination (S). The operation of such a computer is based on the following spherical trigonometric identities as applied to the navigation triangle of Fig. 7. As the aircraft travels the point of departure P becomes the instantaneous position I and the computer will continue to compute the great circle course from the instantaneous position I to the point of destination regardless of whether or not the aircraft is then on a great circle course between the original points of departure and destination, respectively. This navigation triangle is similar to that shown in Fig. 6*a* but for simplification an example has been chosen where the longitude is less than 90°.

$$Lo_D - Lo_{P,I} = Lo_d \qquad (28)$$

where $Lo_d$ is the distance in longitude between the point of departure and the point of destination $$\cos S = \sin L_I \sin L_D + \cos L_I \cos L \cos Lo_d \qquad (29)$$

$$\cos C_A \sin S = \cos L_I \sin L_D - \sin L_I \cos L_D \cos Lo_d \qquad (30)$$

$$\sin C_A \sin S = \cos L_D \sin Lo_d \qquad (31)$$

$$\frac{\cos L_D \sin Lo_d}{\cos L_I \sin L_D - \sin L_I \cos L_D \cos Lo_d}\frac{\sin C_A \sin S}{\cos C_A \sin S} = \tan C_A \qquad (32)$$

$$\sqrt{(\cos L_D \sin Lo_d)^2 + (\cos L_I \sin L_D - \sin L_I \cos L_D \cos Lo_d)^2} = \sqrt{(\sin C_A \sin S)^2 + (\cos C_A \sin S)^2} = \sin S \qquad (33)$$

The cooperation of these three basic servo loops constitute a prime novel feature of the present invention which makes world wide navigation possible without the necessity of terrestrial or celestial fixes, other than the initial fix.

As the aircraft approaches the poles of the earth which are also, of course, the poles of the grid system during the normal mode the longitude rate becomes excessive and beyond the range of practical integrators and the cam 125 on the latitude shaft 85 closes switch 21 which simultaneously energizes and closes the contacts of relays 10, 15, 30, 40, 50, 60, 70 and 80, thus automatically causing the poles of the grid system to be rotated by 90° in the manner previously described. Therefore, whereas the integrators 77 and 89 normally operate at a rate proportional to the respective latitude and longitude changes and their instantaneous displacements represent the instantaneous position of the aircraft, when the poles of the grid system are changed to the transverse system the instantaneous position of the aircraft is computed in terms of the new transverse "latitude" and "longitude" coordinates ($y$) and ($x$), respectively, for integration purposes only and then these components are simultaneously converted back to true latitude and longitude in the conventional geographical grid system. This is accomplished by effectively interposing the ($x$) and ($y$) resolvers 163 and 162, respectively, between the latitude integrator 77 and the longitude integrator 89 and their respective output shafts 85 and 99. This interposition of the resolvers between the integrators and the latitude and longitude output shafts is accompanied by other changes which make the appropriate change in the resolving angle of the speed and direction of travel.

The automatic closing of the relays under the control of the cam switch 121 effects the change in the electrical and mechanical configuration of the heading reference unit 6 (Fig. 2) and the present position computer 7 (Fig. 4) so that the new resolving angle is correctly introduced at the same time the ($y$) resolver 162 and the ($x$) resolver 163 are interposed between the respective integrators 77 and 89 and the respective latitude shaft 85 and longitude shaft 99.

*Great circle computer*

As before mentioned, the latitude and longitude counters of Fig. 4, can be used for manual piloting, or the (L) and (L*o*) quantities can be fed into a great circle computer as input data for the computation of the great circle course angle to destination ($C_A$) and the great circle The symbols have meanings as shown in Fig. 7, in which ($N_G$) represents the North Pole of the earth, (P) represents the point of departure (or present instantaneous position) and (D) represents the destination. The line (PD) represents the shortest, or great circle, path between (P) and (D), and has a length ($d$); and the distance from any instantaneous position (I) during the journey, to destination (D) is represented by (S). The latitude ($L_I$) of point (I) is the angular distance from (I) to the geographical equator (EE′) and the longitude of (I) is termed ($Lo_I$). The latitude of (D) is ($L_D$), and its longitude ($Lo_D$). The true course angle at (P) is ($C_A$).

The triangle (NPD) is automatically and continuously solved for ($C_A$) and (S) by the five resolvers 178, 181, 182, 183, 194 and two differentials 179 and 202 of Fig. 8, the inputs being ($L_I$) and $Lo_I$ secured from the present position computer 7 (Fig. 4) and the coordinates of destination ($L_D$) and ($Lo_D$) being set in manually by the knobs 176 and 177, respectively.

Through the knob 176 the resolver 178 may be adjusted in accordance with the value of ($L_D$) to generate voltages in its secondary stator windings representing, respectively, sin ($L_D$) and (cos $L_D$), it being understood that a source of alternating current 180 of fixed frequency and constant potential is applied to the primary rotor winding 185.

The values of ($Lo_I$) and ($Lo_D$) are subtracted by differential 179 to form ($Lo_d$), in accordance with Equation 28, and the output shaft of the differential rotates the rotor winding of the resolver 181, the rotor winding being energized by a voltage representing (cos $L_D$) supplied by the secondary winding 178″ of the resolver 178. Accordingly, voltages representing ($\cos L_D \cos Lo_d$) and ($\cos L_d \sin Lo_d$), respectively, are generated in the quadrature stator secondaries 181′ and 181″. The voltage of the winding 181′ is supplied to one of the secondary rotor windings of the resolver 182, while the voltage of winding 181″ is supplied to one of the stator primary windings of the resolver 183.

The value of ($L_I$) is supplied as an angular displacement of the output latitude shaft 85 to resolver 182, the two quadrature rotor windings of the latter being energized, respectively, by a voltage representing (sin $L_D$) from secondary 178′ of resolver 178 and a voltage representing ($\cos L_D \cos Lo_d$) from the stator secondary 181′ of resolver 181. Voltages are induced in the quadrature stator secondaries 182′ and 182″, respectively, representing ($\sin L_I \sin L_d + \cos L_I \cos L_d \cos Lo_d$ and $\cos L_I \sin L_D - \sin L_I \cos L_D \cos Lo_d$).

The resolver 183, combined with a servo including amplifier 184 and motor 186 serves as an arc-tangent solver, the rotor of the resolver 183 rotating until the potential induced by the primary stator winding 188 in the secondary rotor winding 187 on shaft 192 is exactly neutralized by that induced by the primary stator winding 189. The angular displacement of shaft 192 represents ($C_A$), the instantaneous course to destination D. This may be shown mathematically by letting ($e_1$) and ($e_2$) represent, respectively, the voltages applied to the stator windings 188 and 189 of resolver 183.

$$e_1 = \cos L_D \sin Lo_d \quad (34)$$

and $$e_2 = \cos L_I \sin L_D - \sin L_I \cos L_D \cos Lo_d \quad (35)$$

Then at null in the rotor secondary 187, $$e_1 \cos C_A = e_2 \sin C_A$$

or $$\frac{e_1}{e_2} = \frac{\sin C_A}{\cos C_A} \quad (36)$$

Substituting for $$\left(\frac{e_1}{e_2}\right)$$

the values from Equations 34 and 35 left hand term of Equation 36 becomes the same as the left term of Equation 32 supra, showing that the shaft displacement at null is the azimuth ($C_A$) of the great circle route from the instantaneous position (I) to destination (D). The angular displacement of shaft 192 is displayed on counter 191 and when subtracted from the ground track angle ($G_A$) by the differential 202 gives a mechanical output representing the course to be steered and is indicated on the pilot direction indicator 204. If desired, this mechanical output could be used to operate an auto-pilot.

The voltage induced in the secondary rotor winding 193 of the resolver 183 is representative of the sum of the two quadrature voltage components, ($e_1$) and ($e_2$). Thus, $$e_3 = e_1^2 + e_2^2 \quad (37)$$

Substituting for ($e_1$) and ($e_2$) their equivalent values from Equations 34 and 35, respectively, gives $$e_3 = \sqrt{(\cos L_D \sin Lo_d)^2 + (\cos L_I \sin L_D - \sin L_I \cos L_D \cos Lo_d)^2} \quad (38)$$

same as the left hand side of Equation 33 and therefore equals (sin S) in value.

This voltage representing (sin S) is supplied to one of the stator windings 190 of the resolver 194 serving as an arc-tangent solver. The other primary winding 196 of the resolver 194 is energized by a voltage representing (cos S), Equation 29. The voltages induced in the secondary rotor winding 197 are proportional, respectively, to the sine and cosine of its angular displacement with respect to the quadrature stator windings 190 and 196.

The resultant error voltage from rotor winding 197 is supplied through the amplifier 195 to energize the servo-motor 195′ which rotates the rotor winding 197 to the position where the voltages induced in this winding from the respective primary windings 190 and 196 are equal and opposite, the angular displacement of the rotor 197 then being the null position represented by the displacement of the shaft 199 and indicated on the counter 198. This displacement represents the distance to destination (S).

The ground track azimuth angle ($G_A$) with reference to true North (Fig. 3) is taken from the heading reference unit 6, Fig. 2, on shaft 201 and is applied in Fig. 8 through one side of differential 202 to the other side of which the desired course angle ($C_A$) is supplied through the shaft 185 from the shaft 192 of the arc-tangent solver 183. The output of differential 202 is applied through a shaft 203 to the center-zero pilot's direction indicator 204. When the aircraft is manually steered it is only necessary to keep the pilot's direction indicator at zero, or the average of its indications at zero, and the great circle course ($C_A$ will thereby be maintained as the average track azimuth ($G_A$) of the aircraft.

From the foregoing it will be seen that the present invention provides a novel, worldwide navigation system which is capable of navigating a vehicle continuously from any point on the earth to any other point on the earth using only readily determinable known reference points, such as the earth's poles, either with or without supplemental celestial or terrestrial observations in the meantime. One of the salient features of the invention is the novel cooperation between the radio-echo speed and direction measuring component with the special heading reference unit, and the present position computer unit in such manner that the instantaneous heading with respect to the known reference point is provided at all times so that it is possible to obtain data which can be simultaneously integrated to compute the great circle course and distance to destination. In the event of any departure from a great circle course this system will immediately recompute the new great circle course and distance from the instantaneous position to destination.

It will be readily apparent to those skilled in the art that many departures can be made from the embodiment illustrated herein without departing from the inventive concept. For example, the resolvers used for the purpose of illustration are all of the inductive type, but it will be readily apparent that other types, such as resistive and capacitive types, may be used. It will be noted that the system provides a number of closed servo loops, some of which are mutually dependent upon each other and one of the servo loops contemplated is one that may include the source of the motive power for steering the vehicle. The invention contemplates that the auto-pilot may be used in this steering servo loop so that the system is capable of completely automatic operation. When the auto-pilot is not used the human pilot may be considered to be a part of this servo loop that steers the airplane and eventually causes it to pass over its point of destination as preselected by the proper manual adjustment from some known instantaneous position, regardless of the fact that there may be deviations from the great circle course.

Although in the illustrated embodiment of the invention the polar axis of the earth is used as the first selected axis of reference with the geographic North Pole as the single point of reference for providing direction information, it is to be understood that any arbitrary axis may be selected and a single reference point other than one of the poles of the earth's axis may be used as the single reference point, provided that the reference point is known in terms of the coordinates referred to the selected axis. For example, it is within the inventive concept that for a flight between two points on the earth a reference axis may be selected which will make it possible to operate the navigation system within a single mode during the entire trip although the route may extend on both sides of the line of 60° geographical latitude which is generally considered to be the dividing line between the area for normal operation and polar mode operation.

What is claimed is:

1. A navigational system comprising, a radio-echo speed and direction measuring component for continuously producing data representing the instantaneous speed and direction of travel of a vehicle with respect to the earth's surface, a heading reference unit for continuously supplying data representing the directional relation with respect to the earth's surface in terms of a set of orthogonal coordinates based on a predetermined axis of the earth, a computing unit for utilizing data from said radio-echo component and from said heading reference unit for providing continuously instantaneous position data in terms of said set of coordinates, said heading reference unit including a gyroscope and feedback means responsive to said computing unit for supplying to said heading reference unit data for continuously correcting gyroscopic errors.

2. A world-wide navigation system comprising, a radio-echo speed and direction-measuring unit for continuously producing data representing the instantaneous speed and direction of travel of a vehicle with respect to the earth's surface, a heading reference unit for continuously supplying data giving the directional relation of the movement of said vehicle with respect to the earth's surface in terms of one set of orthogonal coordinates based on a predetermined axis of the earth, computing means for utilizing data from said radio-echo unit and from said heading reference unit for providing continuously instantaneous position data in terms of said set of coordinates, said computing means including means responsive to position data for providing subsequent instantaneous position data in terms of a second set of orthogonal coordinates based on a second reference axis having a predetermined relation to said first axis.

3. A world-wide navigation system as defined in claim 2 in which the relation between the orthogonal coordinates of the respective systems is defined by the following relations:

$$\cos y \sin B = \sin Lo$$
$$\cos y \cos B = \cos Lo \sin L$$

where Lo and L are the longitude and latitude, respectively, in one coordinate system of a point; $y$ is the corresponding "latitude" in the second coordinate system; and B is the angle between meridians of the two systems at said point.

4. A world-wide navigation system comprising, a radio-echo speed and direction measuring unit for continuously producing data responsive to the instantaneous speed and direction of travel of a vehicle with respect to the earth's surface, a heading reference unit for continuously supplying data giving the directional relation of said vehicle with respect to the earth's surface in terms of one set of orthogonal coordinates based on a predetermined axis of the earth, computing means for utilizing data from said radio-echo unit and from said heading reference unit for providing continuously instantaneous position data in terms of said set of coordinates, said heading reference unit including a gyroscope, feedback means responsive to said computing unit for supplying to said heading reference unit data for continuously correcting systematic gyroscopic errors, said computing means including means responsive to position data for providing subsequent instantaneous position data in terms of a second set of orthogonal coordinates based on a second coordinate axis having a predetermined relation to said first axis.

5. A navigation system for navigating a vehicle relative to the surface of the earth comprising, means cooperating with the earth's surface for continuously providing data representing ground track and speed of the vehicle relative to the earth, means for continuously converting said data into data representing instantaneous position of said vehicle relative to the earth's surface in terms of a system of orthogonal coordinates referred to a selected axis of the earth, said converting means including means responsive to position data for providing subsequent instantaneous data in terms of a second set of orthogonal coordinates based on a second reference axis having a predetermined relation to said first axis and in which the coordinates vary at rates less than the maximum rate of variation of the geographical coordinates of the same instantaneous positions while continuing to provide instantaneous position data in terms of the system of coordinates based on said first reference axis.

6. A system for automatically navigating a vehicle along a great circle path relative to the earth's surface comprising, means cooperating with the earth's surface for continuously providing data representing characteristics of instantaneous relative movement between said vehicle and the earth's surface, a heading reference unit for supplying data representing the heading angle of said vehicle referred to the direction of a great circle through the position of said vehicle and a selected point upon the earth's surface, means for converting data representing speed and heading angle of said vehicle into data representing the instantaneous position of said vehicle in terms of a set of orthogonal coordinates based on a selected axis of the earth, adjusting means operably associated with the output of said converting means for introducing data representing coordinates of a selected point of destination on the earth's surface, means responsive to the conjoint action of said converting means and said adjusting means for deriving continuously the instantaneous great circle course and distance to said selected point of destination and means responsive to the output of the means for providing the data representing instantaneous position of said vehicle for changing the axis of reference of the coordinate system in which the relative position between said vehicle and earth is indicated.

7. A system for navigating a vehicle relative to the earth, comprising, means for determining distance travelled from indications of speed relative to the earth and angular direction of travel of said vehicle relative to a line passing through the vehicle and a first selected point on the surface of the earth, said distance being directly measured and expressed in geographical coordinates in the low regions of the earth's latitudes, coordinate system transfer means actuated upon approach of said vehicle to a polar region of the earth for measuring the distance travelled in a coordinate system in which one of the coordinates varies at a rate less than the maximum rate at which the corresponding geographical coordinate varies while at the same time expressing said distance travelled in terms of geographical coordinates.

8. In a world-wide navigation system, a heading reference unit comprising, a magnetic compass, a control transformer having a stator winding, in which the direction of the resultant field is a function of the earth's magnetic flux, and a rotor having a winding, a directional gyroscope, a magnetic variation cam, a mechanical low-pass filter containing a feedback loop including a variable mechanical connection between said rotor and said gyroscope adapted to be varied by said cam and having an upper cut-off frequency that is lower than the cyclic and acyclic frequencies in data resulting from lack of correspondence of said magnetic variation cam with variations of the horizontal magnetic field of the earth, means for introducing data from said magnetic compass to said feedback loop, a first addition means in said feedback loop for adding thereto data from said directional gyroscope, a second addition means in said feedback loop, and means for introducing to said second addition means systematic gyroscopic corrections dependent upon values of present position data.

9. In a world-wide navigation system, a heading reference unit comprising, a magnetic compass, a directional gyroscope, a servomechanism including an electro-mechanical feedback loop having a slaving time constant greater than the reciprocal of the lowest frequency of data variation to be excluded, means for introducing electrical data from said magnetic compass to said feedback loop, a mechanical adding means in said feedback loop for introducing the mechanical output of said gyroscope to said feedback loop, an electrical adding means in said feedback loop for introducing electrical data representing systematic gyroscopic corrections dependent upon values of instantaneous position data.

10. A navigation computer for continuous automatic computation of the great circle path of a vehicle between any two points on the earth's surface, said path traversing any region thereon including the polar regions comprising, heading reference means for ascertaining the direction from said vehicle of a known point upon the earth's surface with reference to the heading direction of said vehicle and for deriving the heading angle therebetween, said known point being the geographical North Pole when said vehicle is below a selected latitude and said known point being a selected point other than a geographical pole when said vehicle is above said selected latitude, means for receiving vehicular drift angle data and adding it to said heading angle to form ground track angle data, means operatively associated with the latter means for receiving vehicular velocity data and resolving it into north-south and east-west components when said vehicle is below said selected latitude and for resolving the velocity into mutually perpendicular coordinates based upon said selected point other than a geographical pole when said vehicle is above said selected latitude, means responsive to said last named means for integrating said components, means operatively associated with said integrating means for computing from the resulting integrals the total distance travelled in terms of latitude and longitude, means for adding thereto initial latitude and longitude coordinates to determine instantaneous latitude and longitude, means operatively associated with said integrating means and said heading reference means for computing the great circle course and distance, said latter means including means for presetting to values representing geographical coordinates of the preselected destination, whereby the latter computing means continuously computes the great circle distance and course angle to destination referred to true geographical north.

11. A system for the automatic navigation of a vehicle along any great circle path anywhere on the earth's surface including polar regions comprising, first means for securing speed and drift data, heading reference means for ascertaining the vehicle's heading angle referred to a great circle through the instantaneous position of said vehicle and a selected reference point on the earth's surface, said selected point being the geographical North Pole for vehicle positions below a selected latitude, said selected point being other than a geographical pole for vehicle positions above said selected latitude, means responsive conjointly to said first means for securing speed and drift data and to said heading reference means for resolving and integrating said speed and heading data into mutually perpendicular displacement vectors, one of said displacement vectors being in the direction of the great circle through the respective selected points upon the earth's surface both above and below said selected latitude, means for deriving instantaneous latitude and longitude from said displacement vectors, and means connected to said last-named means and including means for introducing coordinates of the point of destination for computing great circle course and distance to destination.

12. A navigation system for the automatic navigation of a vehicle along any great circle path anywhere on the earth's surface including polar regions comprising, means for securing speed and drift data, heading reference means for ascertaining the vehicle's heading angle referred to the great circle meridian through the vehicle and a selected reference point on the earth's surface, said selected point being one of the geographical poles for vehicle positions below a selected limiting latitude, and said selected reference point being other than a geographical pole for vehicle positions above said selected limiting latitude, means responsive to speed and drift data and to heading reference data for resolving and integrating said speed and said heading angle referred to the meridian through said geographical pole directly into geographical latitude and longitude displacement coordinates when the vehicle is below said selected limiting latitude and for resolving and integrating said speed and said heading angle referred to a great circle through the second selected reference point other than a geographical pole into "$x$" and "$y$" displacement coordinates when the vehicle is above said selected limiting latitude, said "$y$" displacement component extending in the direction of the great circle through the vehicle and said second selected reference point, means for deriving instantaneous geographical latitude and longitude from said "$x$" and "$y$" displacement coordinates, means for adding to said latitude and longitude data representing the coordinates of a point of selected destination and means responsive to the composite data and to data from said heading reference means for computing the great circle course and distance to destination from any instantaneous position.

13. A system for the automatic navigation of a vehicle along any great circle path on the earth's surface including polar regions comprising, means for securing speed and drift data, heading reference means for ascertaining the vehicle's heading angle referred to the great circle through the vehicle and a selected reference point on the earth's surface, said selected reference point being the geographical North Pole for vehicle positions below a selected limiting latitude, and for other vehicle positions said selected reference point being the transverse major pole at the intersection of the geographical equator and the geographical 180th meridian, means responsive to speed and drift data and to data from said heading reference means for resolving and integrating said speed and heading data into coordinate displacement components, one of said displacement components being in the direction of the great circle through the respective selected reference point upon the earth's surface both above and below said selected limiting latitude and longitude so that said displacement components are in terms of instantaneous geographical latitude and longitude when the geographical North Pole is the selected reference point, means for converting said displacement components referred to said second reference point into instantaneous geographical latitude and longitude, means for adding to the latitude and longitude data representing the coordinates of a point of selected destination and means responsive to the composite data and to data from said heading reference means for computing great circle course and distance to destination from any instantaneous position.

14. A heading reference unit comprising, a magnetic compass, a synchro operatively associated therewith and having a movable output winding for providing a signal representing magnetic direction, a directional gyroscope mounted for freedom in the horizontal plane about a vertical axis, a position servo controlled thereby, a rate servo, a differential having one input connected to said rate servo and the other input connected to said position servo, a mechanical connection between the output of said differential and said movable output winding of said synchro for controlling the position and the error signal of the latter, an electrical feedback loop between said output winding and said rate servo.

15. A heading reference unit as set forth in claim 14, in which said electrical connection includes means for introducing system error correction signals for compensating for earth rate and longitude rate.

16. A heading reference unit comprising, a magnetic compass, a position servo operatively associated therewith having a movable output winding for providing a servo error signal, a rate servo, a mechanical connection between said rate servo and said movable output winding, said mechanical connection including a differential, a directional gyroscope mounted for free pivotal movement in the horizontal plane and operatively associated with the third side of said differential, an electrical feedback loop between said output winding and said rate servo, said electrical connection including means for adding earth rate and longitude gyro rate corrections to said rate servo, and means for disassociating the servo error signal from said rate servo whereby a heading angle referred to the magnetic meridian initiated by said magnetic compass can be maintained jointly under the control of said magnetic compass and said gyro or by said gyro alone, 17. A system for the automatic navigation of a vehicle along any great circle path anywhere on the earth's surface including polar regions comprising, means for securing speed and drift data, heading reference means for ascertaining the vehicle's heading angle referred to the great circle through the vehicle and a selected reference point on the earth's surface, said selected reference point being the geographical North Pole for vehicle locations below a selected limiting latitude, and said selected reference point being other than a geographical pole for vehicle locations above said selected limiting latitude, automatic means for selecting the geographical North Pole as said selected point when said vehicle passes from above said selected limiting latitude to below said limiting latitude, and for selecting one point of the earth's surface other than a geographical pole as said selected reference point when said vehicle passes from below said selected limiting latitude to above said selected limiting latitude, means actuated from said means for securing speed and drift data and from said heading reference means for resolving and integrating speed and heading data into mutually perpendicular displacement components, one of said displacement components being in the direction of said great circle through the respective selected reference point upon the earth's surface both above and below said selected limiting latitude, said displacement components being in terms of geographical latitude and longitude when the North Pole is used as the reference point, means for converting said displacement components based on said second reference point into instanetaneous geographical latitude and longitude, means for adding to said latitude and longitude data additional data representing geographical coordinates of a selected destination point, and means responsive to the composite data and to said means for deriving instantaneous latitude and longitude for computing great circle course and distance to destination from any instantaneous position.

18. In a navigation system, a heading reference unit comprising, a magnetic compass, a synchro operatively associated therewith and having a movable output winding for providing an error signal, a directional gyroscope mounted for free pivotal movement about the vertical axis, a differential having two inputs and one output, one of said inputs operatively responsive to the position of said gyroscope, a rate servo connected to the other of said inputs of said differential, a mechanical connection between the output of said differential and said movable output winding of said synchro for controlling the position and the error signal induced in the latter, an electrical feedback loop between said output winding and said rate servo, a radio-echo speed and direction-measuring unit for continuously producing data responsive to the instantaneous speed and absolute direction of a vehicle with respect to the earth's surface, a computing unit for utilizing data from said radio-echo unit and from said heading reference unit for providing continuously instantaneous position data in terms of a set of orthogonal coordinates based on a selected axis and for supplying to the electrical feedback loop of said rate servo signals representing earth rate and longitude rate corresponding to the set of coordinates chosen, whereby the gyro drift is substantially eliminated and any remaining drift error is corrected by said magnetic compass.

19. In a navigation system as set forth in claim 18 in which said computer unit includes means for alternatively computing instantaneous position in terms of a second set of orthogonal coordinates based on a reference point preselected so that the longitude rate varies at a rate different from the longitude rate corresponding to the first selected point of reference, means for supplying to the electrical feedback loop of said rate servo signals representing the new longitude rate and means for continuously introducing into the mechanical connection between said rate servo and said output winding an angular deflection corresponding to the instantaneous angle between the meridians of the sets of orthogonal coordinates.

20. In a navigation system as set forth in claim 19 including means responsive to said computing unit for continuously introducing corrections into the mechanical connection between the output of said differential and said movable output winding corresponding to the variations in the magnetic deviation in the general area indicated by the instantaneous orthogonal coordinates.

21. A navigation system as set forth in claim 19, including means responsive to said computing unit for supplying to said mechanical connection an angular deflection representing the instantaneous magnetic declination corresponding to the instantaneous position relative to the earth.

22. In a navigation system for navigating a dirigible vehicle, a heading reference unit including a magnetic compass, a synchro operatively associated therewith and having a movable output winding for providing an error signal, a directional gyroscope mounted by free pivoted movement about the vertical axis, a differential having two inputs and one output, one of said inputs operatively responsive to the position of said gyroscope, a rate servo connected to the other of said inputs of said differential, a mechanical connection between the output of said differential and said movable output winding of said synchro for controlling the position and the error signal of the latter, an electrical feedback loop between said output winding and said rate servo, a radio-echo speed and direction measuring unit for continuously producing data responsive to the instantaneous speed and the ground track of the vehicle, a computing unit for utilizing the speed and ground track data from said radio-echo unit and for utilizing direction data from said heading reference unit for providing continuously instantaneous position data in terms of a set of orthogonal coordinates based on a selected axis and for supplying to the electrical feedback loop of said rate servo signals representing the earth rate and geographical longitude rate corresponding to the geographical longitude whereby the gyroscope drift is substantially eliminated and any remaining drift error is servoed out by said magnetic compass, means responsive to data representing one of the terms of the set of orthogonal coordinates from said computing unit for selecting a second set of coordinates based on an axis having a predetermined relation to the axis of said first set of coordinates, means for providing continuously instantaneous position data in terms of the second set of orthogonal coordinates and means for instantaneously converting such position data into instantaneous position data in terms of said first set of orthogonal coordinates.

23. In a navigation system, a heading reference unit including a magnetic compass having a synchro operatively associated therewith, the latter having a movable output winding for providing an error signal; a directional gyroscope mounted for free pivotal movement about the vertical axis; a differential having two inputs and one output; one of said inputs operatively responsive to the position of said gyroscope; a rate servo connected to the other of said inputs of said differential; a mechanical connection between the output of said differential and said movable output winding of said synchro for controlling the position and the error signal of the latter, an electrical feedback loop between said output winding and said rate servo, a radio-echo unit for providing data representing true speed and ground track of the vehicle, means for algebraically combining ground track and magnetic heading to produce true North data, a computing unit responsive to direction data referred to true North and to data representing true ground speed for resolving speed and direction into velocity vectors in a first coordinate system based on a selected axis, means for integrating said velocity vectors into coordinate displacement vectors referred to said first set of coordinates, means responsive to said integrators for supplying to said electrical feedback loop signals representing earth rate and a rate correction corresponding to geographical longitude rate, means for converting data representing speed and ground track of said vehicle into data representing instantaneous speed of the vehicle in terms of a second set of orthogonal coordinates based on a second selected reference axis having a preselected relation with respect to said first axis, means including said integrators for simultaneously solving the relation between said two coordinate systems to give correction signals for said electrical feedback loop for the earth rate and "longitude" rate, a correction angle for the ground track and for converting the instantaneous speed corrections into terms of the first set of orthogonal coordinates.

24. A computer system for navigating a vehicle over any part of the surface of the earth comprising, means for converting indications of speed and ground track angle to increments of travel in orthogonal coordinates of direction based on standard geographical compass directions in the medial regions of the earth's surface, means for converting said increments of travel to indications of instant latitude and longitude, means operative in response to said indications of latitude and longitude upon approach of said vehicle to the polar regions of the earth's surface to measure said increments of travel in a system of orthogonal coordinates of direction angularly displaced with respect to the standard geographical system of coordinates, and means for converting said last mentioned increments of travel to indications of geographical latitude and longitude.

25. A system for the navigation of a vehicle anywhere on the earth including the geographical polar regions comprising, means responsive to the ground track angle and speed data for resolving said speed into two orthogonal coordinate velocity components, said ground track angle being referred to the geographical pole corresponding to the hemisphere in which the vehicle is navigating when the vehicle is at positions between the geographical pole and the equator and below a selected latitude so that the integration of the respective velocity components provides respective orthogonal displacement components, means for integrating said velocity components to provide such orthogonal displacement components in terms of geographical latitude and longitude, means responsive to the position of said vehicle in terms of the geographical latitude and longitude for modifying the operation of said integrating means so that thereafter it computes in terms of an orthogonal coordinate system based on an axis at a selected relation to said geographical axis when the vehicle is operating in the region above said selected latitude limit and means operably associated with said integrating means for converting said orthogonal displacement components derived when said ground track angle is referred to a reference point other than a geographical pole into instantaneous geographical latitude and longitude.

References Cited in the file of this patent

UNITED STATES PATENTS

| | | |
|---|---|---|
| 2,178,306 | Lauck | Oct. 31, 1939 |
| 2,403,091 | Lear | July 2, 1946 |
| 2,406,836 | Holden | Sept. 3, 1946 |
| 2,472,129 | Streeter | June 7, 1949 |
| 2,476,032 | Feldman | July 12, 1949 |
| 2,581,438 | Palmer | Jan. 8, 1952 |
| 2,647,233 | Kutzler | July 28, 1953 |
| 2,669,710 | Sherr | Feb. 16, 1954 |
| 2,688,440 | Gray | Sept. 7, 1954 |
| 2,699,612 | Kellogg | Jan. 18, 1955 |
| 2,741,855 | McKinley | Apr. 17, 1956 |
| 2,744,683 | Gray | May 8, 1956 |
| 2,781,168 | Greenwood | Feb. 12, 1957 |